United States Patent
Tashiro et al.

(10) Patent No.: US 6,622,480 B2
(45) Date of Patent: Sep. 23, 2003

(54) DIESEL PARTICULATE FILTER UNIT AND REGENERATION CONTROL METHOD OF THE SAME

(75) Inventors: Yoshihisa Tashiro, Fujisawa (JP); Takehito Imai, Fujisawa (JP); Tsuneo Suzuki, Fujisawa (JP); Naofumi Ochi, Fujisawa (JP); Masashi Gabe, Fujisawa (JP)

(73) Assignee: Isuzu Motors Limited, Tokyo (JP)

(*) Notice: Subject to any disclaimer, the term of this patent is extended or adjusted under 35 U.S.C. 154(b) by 0 days.

(21) Appl. No.: 10/075,391

(22) Filed: Feb. 15, 2002

(65) Prior Publication Data

US 2002/0112472 A1 Aug. 22, 2002

(30) Foreign Application Priority Data

Feb. 21, 2001 (JP) .................................. 2001-044445
Feb. 22, 2001 (JP) .................................. 2001-046993

(51) Int. Cl.$^7$ ............................................. F01N 3/00
(52) U.S. Cl. ......................... 60/295; 60/274; 60/297; 60/311; 60/286
(58) Field of Search ................. 60/274, 286, 277, 60/295, 297, 311, 303

(56) References Cited

U.S. PATENT DOCUMENTS

| 4,835,964 A | * | 6/1989 | Kume et al. ................... 60/285 |
| 4,934,142 A | * | 6/1990 | Hayashi et al. ................ 60/279 |
| 5,711,149 A | * | 1/1998 | Araki .......................... 60/278 |
| 5,716,586 A | * | 2/1998 | Taniguchi .................... 422/173 |
| 6,367,246 B1 | * | 4/2002 | Hirota et al. ................. 60/295 |
| 6,405,528 B1 | * | 6/2002 | Christen et al. .............. 60/295 |
| 6,438,948 B2 | * | 8/2002 | Ono et al. ..................... 60/311 |

* cited by examiner

Primary Examiner—Thomas Denion
Assistant Examiner—Binh Tran
(74) Attorney, Agent, or Firm—Staas & Halsey LLP

(57) ABSTRACT

A diesel particulate filer unit 1 comprising a filter 4 for capturing particulates in the exhaust gas G of an engine E, and a regeneration control means 50 judging the start of the regeneration operation of said filter 4, according to the comparison between the value measured by exhaust pressure sensors 51, 52 and a predetermined exhaust pressure judgment value ΔPes, Pes, Res wherein said regeneration control means 50 is configured to estimate the ash accumulated quantity SAsh of ash leaked into the exhaust gas G and accumulated in said filer 4, and correct said exhaust pressure judgment value ΔPes, Pes, Res for judging the regeneration operation start based on this. Thereby, a diesel particulate filter that can judge the regeneration start timing appropriately, taking accumulation and deposit of ash generated from lubricant oil on the filter into consideration, and remove particulates efficiently all the way preventing the filter from clogging is provided.

13 Claims, 13 Drawing Sheets

Fig. 15
(a)
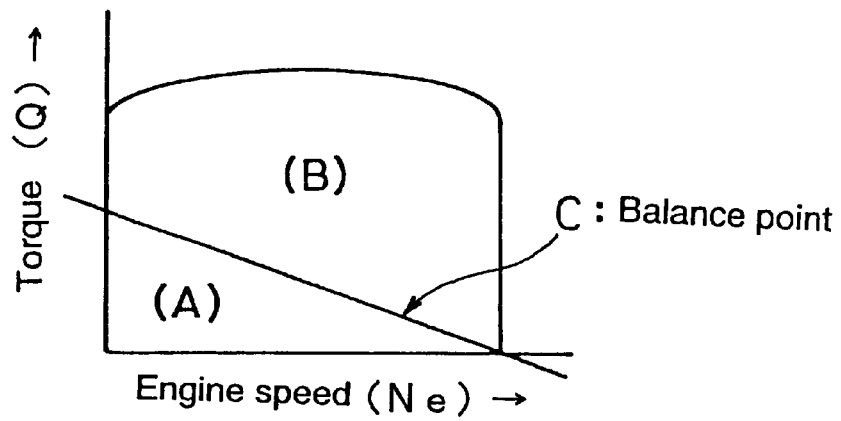
(b)
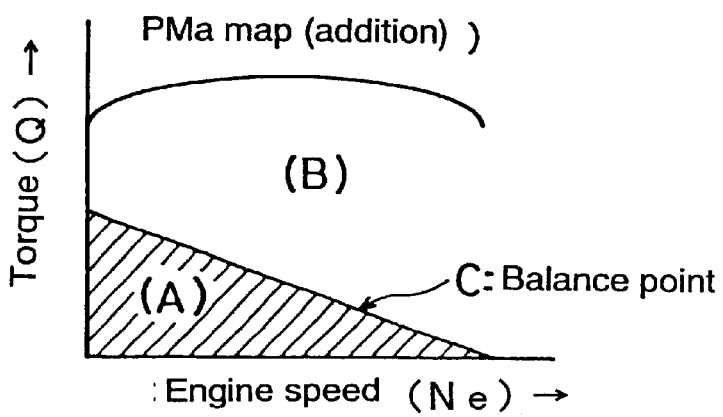
(c)
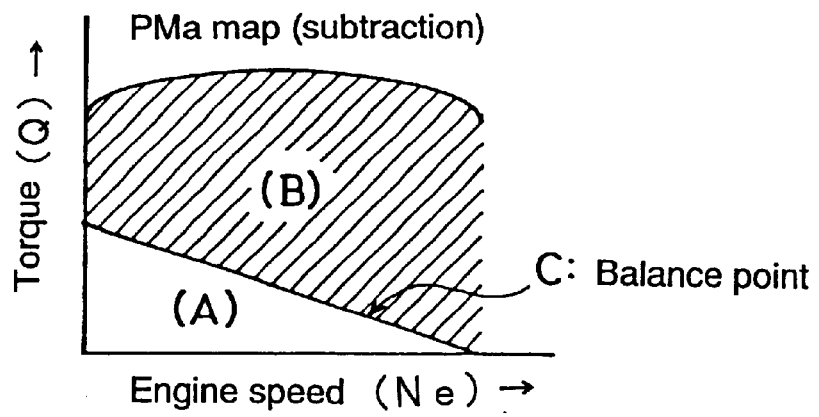

Fig. 16
(a) PMs
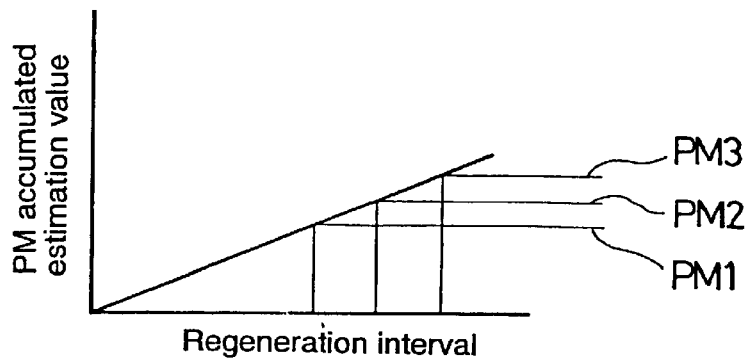
(b) (PM1 ≦ PMs < PM2)
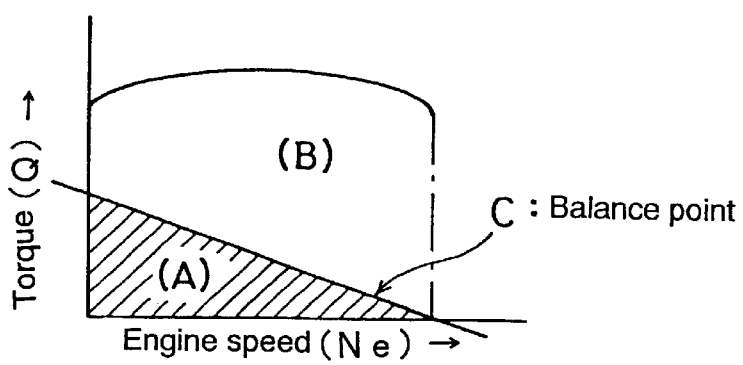
(c) (PM2 ≦ PMs < PM3)
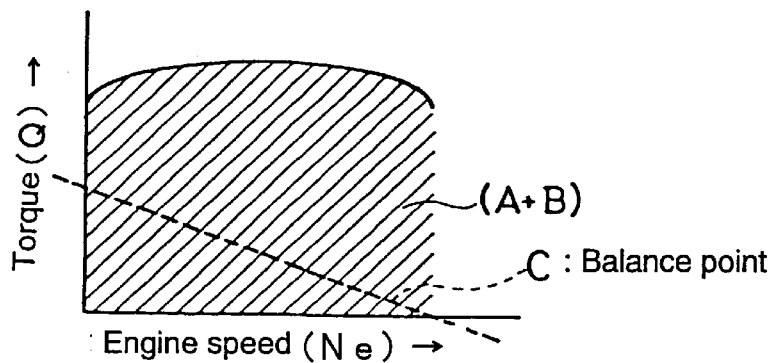

DIESEL PARTICULATE FILTER UNIT AND REGENERATION CONTROL METHOD OF THE SAME

BACKGROUND OF THE INVENTION

The present invention concerns a continuous regeneration type diesel particulate filer unit for cleaning the exhaust gas by capturing particulate of a diesel engine and a regeneration control method of the same.

The restriction of discharge quantity of particulate (the PM: particulate: referred to as the PM hereinafter) discharged from the diesel engine is reinforced year by year together with NOx, CO and HC or the others. Therefore, a technique for reducing the quantity of the PM discharged outside, by capturing the PM by means of a filter called diesel particulate filer (DPF: Diesel Particulate Filter: referred to as DPF hereinafter) has been developed.

The DPF for capturing the PM includes monolith honeycomb form wall flow type filters made of ceramics, fiber filter type filters made of fiber shape ceramics or metal, or the others. The exhaust emission control device using these DPFs are installed in the middle of the engine exhaust pipe, similarly to the other exhaust emission control devices, for cleaning exhaust gas generated in the engine before discharging.

However, the filter of DPF unit for the PM capture is clogged gradually along with the capture of the PM and the exhaust pressure raises substantially in proportion to the quantity of captured the PM, thus requiring to remove the PM from the filer. Mainly three kinds of method and unit have been developed.

The first of them concerns a regeneration unit and method of the same for using two filters alternately to capture the PM in exhaust gas by one filter and regenerate by burning the captured the PM heating by the other filter through an electric heater or the like.

The second method and unit consists in using a solid filer as filter, disposing an oxidation catalyst upstream the solid filter, and treating the PM captured in the solid filter by a chemical reaction based on the oxidation catalyst.

The third method and unit consists in using a solid filter provided with catalyst and a catalyst additive agent for accelerating the burning of the PM.

Primary clogging factors of these DPF units include, in addition to smog or the like that are unburned components of the fuel and ash of burned lubricant oil.

The lubricant oil is supplied to different parts of an engine and the periphery of piston rings from a lubricant oil reservoir to circulate in the engine, and penetrates into the engine cylinder from the peripheries of piston rings and valves.

When the lubricant oil is exposed to a high temperature in the engine cylinder, calcium, zinc or other ingredients contained in the lubricant oil are not burned and remain as ash, and the ash is contained and borne by the exhaust gas and captured by the filter of a DPF unit.

Moreover, the ash captured by the filter is not burned and not removed by the filter regeneration operation or the others and accumulated in the filter even slightly. Lubricant oil leaks extremely slightly on the order of several tens of litter per ten thousand km of traveling; however, its total amount can not be neglected as the mileage increases. If the mileage attains the order of several ten thousand km or a hundred thousand km, the filter clogging due to the ash deposit and accumulation progresses, affecting the exhaust pressure before and after the filter.

On the other hand, in the DPF unit of the related art, the clogging of filter due to the PM is judged by comparing the exhaust pressure measured before and after the filter and a predetermined exhaust pressure judgment value, and it is so controlled to start the filter regeneration operation, when exhaust pressure, difference pressure, pressure ratio or the others calculated from the measured exhaust pressure exceeds the predetermined judgment value.

However, the PDF unit of the related art has a problem that the exhaust pressure raises gradually along with the increase of mileage, as the filter clogging due to ach generated from the lubricant oil is not considered, making the judgment to start the regeneration operation becomes gradually inappropriate.

Besides, the second and the third units are units for lowering the burning start temperature of the PM by the function of a catalyst such as γ alumina, Pt, zeolite, or the like supported by the filter, and incinerating the PM by the exhaust gas, called "continuous regeneration type DPF".

In case of the continuous regeneration type DPF, the temperature of exhaust gas flowing in the PDF may be increased to a temperature for activating the catalyst (par example, equal or superior to 250° C.).

The PM cleaning mechanism in the exhaust gas is different according to engine operation areas (torque and engine speed) (C1), (C2) as shown in FIG. 17.

First, in the area (C1), carbon (C: the PM) is oxidized to carbon dioxide ($CO_2$) through a reaction ($4CeO_2 + C \rightarrow 2CeO_3 + CO_2$, $2CeO_3 + O_2 \rightarrow 4CeO_2$) by catalytic action of the a filter with catalyst 4, while in the area (C2), carbon (C: the PM) is oxidized to carbon dioxide ($CO_2$) through a reaction ($C + O_2 \rightarrow CO_2$).

Then, in the engine operation areas (torque and engine speed) (C1), ($C_2$) as shown in FIG. 17, the PM in the exhaust gas G is cleaned continuously regenerating the filter with catalyst 4, by cleaning the PM captured by the filter with catalyst 4. It should be appreciated that though the division between these (C1) and (C2) is schematically shown in FIG. 17, there is not necessarily a clear boundary, but main reaction varies gradually.

However, for the continuous regeneration type DPF unit, in case where the exhaust gas temperature corresponding to the engine operation area (D) in FIG. 17 is low, the catalyst temperature lowers deteriorating the catalyst activity, and therefore, the aforementioned action does not occur, and the filter can not be regenerated by oxidizing the PM. Consequently, the PM continues to accumulate, clogging the filter.

Especially, during idling or low load driving, and during engine brake operation on a downhill or the others, the fuel burns hardly, and a cool exhaust gas flows into the filter with catalyst, lowering the catalyst temperature and deteriorating the catalyst activity. Moreover, the PM deposits on the filter during the driving period of time where the filter can not be regenerated.

BRIEF SUMMARY OF THE INVENTION

The first object of the present invention is to provide a diesel particulate filer unit (DPF unit) allowing to judge appropriately the start timing of regeneration operation, by estimating the state of accumulation of ash generated from a lubricant oil and correcting or compensating the exhaust pressure judgment value concerning the exhaust pressure used for judging the regeneration start, with the ash accumulated estimation value, and to remove the PM efficiently, all the way preventing the filter from clogging.

The second object of the present invention to provide a DPF unit allowing to remove the PM efficiently all the way preventing securely the filter from clogging, by controlling the engine exhaust gas temperature, through surveillance of the accumulation state of the PM.

The DPF unit for achieving the first object is configured as follows.

1) A DPF unit comprising a filter for capturing particulates in the exhaust gas of a diesel engine, an exhaust pressure sensors disposed in an exhaust passage, and a regeneration control means for starting the regeneration operation of said filter, according to the judgment results based on the comparison between the exhaust pressure measured by the exhaust pressure sensors and a predetermined exhaust pressure judgment value, and regenerating said filter by removing particulates captured by said filter through combustion or chemical reaction by a catalyst, wherein said regeneration control means is configured to estimate the ash accumulated quantity of ash leaked into the exhaust gas and accumulated in said filer and to correct said exhaust pressure judgment value for judging the regeneration operation start based on said ash accumulated estimation value.

Concerning the DPF unit and its regeneration operation, as follows, there are regeneration operations corresponding respective type of PDF unit; the other PDF units or regeneration operations may by devised.

The regeneration operation used often for a PDF unit changing over a plurality of filters alternately includes an operation to incinerate particulates by turning on a heating heater disposed in the filter and heating the filer to the particulate combustion temperature or higher. Moreover, the regeneration operation for a DPF unit supporting a catalyst by the filter includes an operation for removing particulates through a chemical reaction by the catalyst, by raising the exhaust gas temperature.

Besides, the judgment based on the comparison between the exhaust pressure measured by the exhaust pressure sensors and the predetermined exhaust pressure judgment value includes manners of judgment described below, or manners of judgment by the combination thereof; however, the other judgments may be adopted provided that they use the exhaust pressure and the predetermined exhaust pressure judgment value.

One of them consists in comparing the exhaust pressure Pe measured by an exhaust pressure sensors disposed upstream the filter and a predetermined exhaust pressure judgment value Pes, and starting the regeneration operation when the measured exhaust pressure Pe exceeds the predetermined exhaust pressure judgment value Pes.

Another one consists in comparing the differential pressure $\Delta Pe=Pe-Peb$ between the exhaust pressure Pe measured by an exhaust pressure sensors disposed upstream the filter and the exhaust pressure Peb measured by an exhaust pressure sensors disposed downstream the filter with a predetermined exhaust pressure judgment value $\Delta Pes$, and starting the regeneration operation when the measured exhaust pressure $\Delta Pe$ exceeds the predetermined exhaust pressure judgment value $\Delta Pes$.

Besides, there is also a judgment method for comparing the pressure ratio $Re=Pe/Peb$ and a predetermined pressure ratio judgment value Res, in place of differential pressure $\Delta Pe$, and starting the regeneration operation when the measured pressure ratio Re exceeds the predetermined pressure ratio judgment value Res.

2) The aforementioned DPF unit, wherein the regeneration control means is configured to calculate the ash quantity accumulated in said filter during an engine operation state, from the torque of an engine and the engine speed, and to calculate the ash accumulated estimation value, through the cumulative computation of the calculated ash quantity.

For calculating the ash quantity Ash of combustion remaining ash of leaked lubricant oil depositing and accumulating on the filter during the operation state of an engine, from the torque Q of the engine and the engine speed Ne, a map data Mash (Q, Ne) and a function fash (Q, Ne) are prepared, and they are used. The map date Mash is to be determined beforehand from the relation between the torque Q of an engine and the engine speed Ne obtained by experiment and computation, and the ash quantity Ash to be accumulated in the filter during such engine operation state.

The ash quantity can be determine from the quantity of lubricant oil consumed according to the engine operation state, by means of experiment or computation. Besides, as an ash quantity is produced on the order of 8 g to 10 g by one (1) litter of lubricant oil, the map data Mash (Q, Ne) and the function fash (Q, Ne) can also be obtained by converting the exhaust pressure increment due to the clogging of the filter with the ash quantity, from the ash quantity.

3) The aforementioned DPF unit, wherein the regeneration control means are configured to calculate an exhaust pressure coefficient corresponding to said ash accumulated estimation value, and correct said exhaust pressure judgment value to a value determined by multiplying a reference judgment value by the exhaust pressure coefficient.

In short, an exhaust pressure coefficient $\alpha 1$ corresponding to the ash accumulated estimation value $SAsh=\Sigma(Ash\times\Delta t)$ is calculated, the reference judgment value $\Delta Pe0$, $Pe0$, $Re0$ is multiplied by the exhaust pressure coefficient $\alpha 1$ to determined the value of $\alpha 1\times\Delta Pe0$, $\alpha 1\times Pe0$, $\alpha 1\times Re0$ and the reference judgment value $\Delta Pe0$, $Pe0$, $Re0$ is replaced, by the value, to correct.

4) The aforementioned DPF unit, wherein the regeneration control means is configured to calculate the reference judgment value, from the torque of an engine and the engine speed, of the time when the exhaust pressure for judging the regeneration start timing is measured by an exhaust pressure sensor.

In the calculation of the reference judgment value $\Delta Pe0$, $Pe0$, $Re0$ also, the reference judgment value $\Delta Pe0$, $Pe0$, $Re0$ for judging the regeneration start timing concerning the operation state of an engine presenting an engine torque Q and an engine speed Ne is obtained beforehand by experiment or computation, they are prepared as map data $M\Delta pe0$ (Q, Ne), $Mpe0$ (Q, Ne), $Mre0$ (Q, Ne) or function $f\Delta pe0(Q, Ne)$, $fpe0(Q, Ne)$, $fre0(Q, Ne)$, and they are used.

The regeneration control method of the DPF unit for achieving the aforementioned first object is configured as follows.

1) In a diesel particulate filer unit comprising a filter for capturing particulates in the exhaust gas of a diesel engine, exhaust pressure sensors disposed in an exhaust passage, and a regeneration control means for starting the regeneration operation of said filter, according to the judgment results based on the comparison between the exhaust pressure measured by the exhaust pressure sensors and a predetermined exhaust pressure judgment value, and regenerating said filter by removing particulates captured by said filter through combustion or chemical reaction by a catalyst, the ash accumulated quantity of ash leaked into the exhaust gas and accumulated in said filer is estimated and said exhaust pressure judgment value for judging the regeneration operation start based on an ash accumulated estimation quantity is corrected.

2) The regeneration control method of the aforementioned DPF unit, configured to calculate the ash quantity accumulated in said filter during an engine operation state, from the torque of an engine and the engine speed, and to calculate the ash accumulated estimation value, through the cumulative computation of the calculated ash quantity.

3) The regeneration control method of the aforementioned DPF unit, configured to calculate an exhaust pressure coefficient corresponding to the ash accumulated estimation value, and correcting the exhaust pressure judgment value, to a value determined by multiplying the reference judgment value by the exhaust pressure coefficient.

4) The regeneration control method of the aforementioned DPF unit, configured to calculate the reference judgment value, from the torque of an engine and the engine speed, of the time when the exhaust pressures for judging the regeneration start timing are measured by exhaust pressure sensors.

According to the DPF unit of the aforementioned composition and the regeneration control method of the same, the following functional effects can be obtained.

The effect of accumulation in the filter of ash left after the combustion of lubricant oil leaking from the cylinder of an engine into the exhaust gas is reflected on the judgment of regeneration start timing, because the exhaust pressure judgment value to be used for judging the regeneration operation start is corrected or compensated with the accumulated estimation value (deposit calculated value) of the lubricant oil, all the way estimating the state of accumulation and deposit on the filter of ash left after the combustion of lubricant oil of the engine. As the result, the judgment of regeneration start timing is performed always appropriately.

Then, the ash quantity accumulating in the filter is calculated from the torque of the engine and the engine speed, using the relation between torque of the engine and engine speed and ash accumulation quantity, determined beforehand through experiment or computation, and the ash accumulated estimation value can be estimated correctly by a simple algorithm, by calculating the accumulated estimation value through a cumulative computation of the ash quantity.

In addition, for the correction of exhaust pressure judgment value, as an exhaust pressure coefficient corresponding to the accumulated estimation value is calculated, and the exhaust pressure judgment value is corrected to a value determined by multiplying the reference judgment value by the exhaust pressure coefficient, the operation for reflecting the effect of lubricant oil on the judgment of regeneration start timing becomes an extremely simple computation.

Moreover, as the reference judgment value is calculated from the torque of engine and the engine speed of the time when the exhaust pressure for judging the regeneration start timing, using the relation between torque of the engine and engine speed and ash accumulation quantity, determined beforehand through experiment or computation, and the exhaust pressure judgment value is calculated from the reference judgment value, the measured exhaust pressure and the exhaust pressure judgment value for comparison judgment result in being able to be compared one the other for the operation state of a same engine. Consequently, the difference of exhaust pressure due to the difference of operation state of the engine is cancelled, the judgment of regeneration start timing can be performed more finely and appropriately.

As a result, the regeneration start timing of the filter of the DPF unit can be judged correctly, even when the mileage of a diesel engine vehicle having the DPF unit on board. Consequently, it can travel removing the PM efficiently by preventing the filter from clogging.

Moreover, a DPF unit for achieving the second object is configured as follows.

1) A continuous regeneration type diesel particulate filer unit comprising a filter with catalyst for capturing particulates in the exhaust gas from a diesel engine and, burning the captured particulates by catalytic action, wherein an oxidation catalyst is disposed upstream the filter with catalyst, for raising the exhaust gas temperature through oxidation of HC and CO in the exhaust gas.

According to the configuration, the oxidation catalyst disposed upstream the continuous regeneration type filter with catalyst can oxidize carbon monoxide (CO) and unburned fuel (HC) or the like in the exhaust gas, for raising the exhaust gas temperature flowing into the filter with catalyst. Therefore, the temperature of the filter with catalyst can raise even in an engine operation state at a relatively low exhaust gas temperature, allowing to burn and remove particulates (the PM) being captured.

Then, in a normal operation, during an operation state (A) of an engine of low revolution speed, the PM are burned and removed by raising the exhaust gas temperature, through execution of fuel injection control such as retard operation of main injection timing and post injection or the like, as mentioned below, when the filter with catalyst comes to be clogged.

2) The aforementioned continuous regeneration DPF unit comprising a regeneration control means for performing a regeneration processing against the clogging of said filter with catalyst and, wherein said regeneration control means is configured to activates said oxidation catalyst by raising the exhaust gas temperature through fuel injection control of an engine, during regeneration of said filter with catalyst under an engine operation condition where the exhaust gas temperature of the engine is lower than the activation temperature of said oxidation catalyst, for burning and removing particulates captured by said filter with catalyst.

According to the configuration, the exhaust gas temperature raises, the oxidation catalyst is activated and the temperature of exhaust gas passing through the oxidation catalyst raises furthermore, through execution of fuel injection control such as retard operation of main injection timing and post injection or the like, even in an operation state of an engine of low torque and low revolution speed, where the exhaust gas temperature is low, and the captured particulates can not be burned and removed, by a continuous regeneration type DPF unit of the related art.

Therefore, the temperature of the filter with catalyst raised, and particulates captured by the filter with catalyst are burned and removed by catalytic action of the filter with catalyst. Consequently, the filter with catalyst is not clogged even during a prolonged idling operation, a low speed operation, or a downhill traveling operation where the engine brake is activated, allowing to capture continuously particulates in the exhaust gas.

On the other hand, as combustion of particulate is made to be controlled by controlling the exhaust gas temperature through retard operation of main injection timing or post injection of fuel injection, without using a heating heater, the fuel injection comes to be performed by a fuel injection control unit which is already installed. Consequently, it becomes unnecessary to install additionally a heater for heating, a power supply, or other new equipment or new control units, allowing to make the whole unit compact. Consequently, it results in an unit that can be attached simply to a vehicle.

3) The aforementioned continuous regeneration type DPF unit, configured to raise the exhaust gas temperature by said fuel injection control in multiple stages equal or superior to two stages.

According to the configuration, the exhaust gas temperature is raised in multiple stages equal or superior to two stages, preventing an uncontrolled combustion from occurring when the PM accumulated in the filter with catalyst burns suddenly in a manner of chain reaction, and avoiding damage of the filter with catalyst when its temperature becomes equal or superior to the fusion damage temperature.

4) Also, the aforementioned continuous regeneration type DPF unit, wherein said fuel injection control is configured to comprise, at least, either one of retard operation of main injection or post injection operation.

According to the configuration, as retard operation of main injection and post injection operation are adopted as fuel injection control, one can cope only by changing the program of an existing fuel injection control unit, and the filter regeneration becomes possible relatively simply even in a low torque, low revolution speed area of an engine.

In addition, the regeneration control method of the continuous regeneration type DPF unit for achieving the aforementioned second object is configures as the following method.

1) In a continuous regeneration type diesel particulate filer unit formed by comprising a filter with catalyst for capturing particulates in the exhaust gas from a diesel engine and, burning the captured particulates by catalytic action, and an oxidation catalyst disposed upstream the filter with catalyst, for raising the exhaust gas temperature through oxidation of HC and CO in the exhaust gas, a method configured to raise the exhaust gas temperature through fuel injection control of the engine, during the regeneration of said filter with catalyst under an engine operation condition where the exhaust gas temperature of the engine is lower than the activation temperature of said oxidation catalyst, in order to burn and remove particulates captured by said filter with catalyst.

According to the aforementioned method, the exhaust gas temperature raises, the oxidation catalyst is activated and the captured particulates are burned and removed by catalytic action of the filter with catalyst, through execution of fuel injection control such as retard operation of main injection timing and post injection or the like, in an operation state of an engine of low torque and low revolution speed, where the exhaust gas temperature is low, the oxidation catalyst is poorly active, and the captured particulates can not be burned and removed, by a regeneration control method for continuous regeneration type DPF unit of the related art. Therefore, the filter with catalyst is not clogged even during idling operation, low speed operation, or such a downhill traveling operation that the engine brake is activated, allowing to capture continuously particulates in the exhaust gas.

2) The regeneration control method of the aforementioned continuous regeneration type DPF unit, configured to raise the exhaust gas temperature by said fuel injection control in multiple stages equal or superior to two stages.

According to the method, the exhaust gas temperature is raised in multiple stages equal or superior to two stages, preventing the PM accumulated in the filter with catalyst from burning suddenly in a manner of chain reaction, and damaging the filter with catalyst when its temperature becomes equal or superior to the fusion damage temperature.

3) The regeneration control method of the aforementioned continuous regeneration type DPF unit, wherein said fuel injection control is configured to comprise, at least, either one of retard operation of main injection or post injection operation.

According to the method, as retard operation of main injection and post injection operation are adopted as fuel injection control, one can cope only by changing the program of an existing fuel injection control unit, and the filter with catalyst can be regenerated relatively simply even in a low torque, low revolution speed area of an engine.

4) The regeneration control method of the aforementioned continuous regeneration type DPF unit, configured to raise at first the exhaust gas temperature through retard operation of fuel main injection and to raise further the exhaust gas temperature, by adding the fuel post injection operation, when the temperature of the exhaust gas flowing into said filter with catalyst attains a predetermined first target temperature value.

According to the method, the exhaust gas temperature is raised through retard operation of main injection timing for preheating the oxidation catalyst, during the start of regeneration mode operation, and after activation of the oxidation catalyst, the post injection is performed, allowing to prevent white smoke from generating, which otherwise tends to generate during the regeneration start.

5) The regeneration control method of the aforementioned continuous regeneration type DPF unit, configured to further raise the exhaust gas temperature, by increasing the injection quantity of fuel post injection, after the temperature of the exhaust gas flowing into said filter with catalyst attains a predetermined second target temperature value by a post injection of fuel of a given quantity, during said fuel post injection operation.

According to the method, a sudden temperature elevation due to a sudden combustion of deposited the PM in a chain reaction manner can be prevented, and the fusion damage of the filter with catalyst can be avoided, because the temperature of exhaust gas entering the filter with catalyst in two stages or multiple stages.

6) The regeneration control method of the aforementioned continuous regeneration type DPF unit, configured to estimate the quantity of particulate to be accumulated in said filter with catalyst during the operation of an engine and the quantity of particulate to be burned and removed from the operation state of the engine, calculate the accumulated estimation value of particulate by cumulative computation, and to judge the regeneration start by using whether the accumulated estimation quantity of the particulate has exceeded a predetermined accumulation quantity or not.

According to the method, as the regeneration mode operation can be entered, when the accumulated estimation quantity of particulate has exceeded the predetermined accumulation quantity, along with the estimation computation of accumulation state of the particulate, the regeneration of filter with catalyst can be performed with an optimal timing.

Therefore, the particulate can be captured, burned and removed efficiently, all the way preventing the fuel efficiency from deteriorating.

BRIEF DESCRIPTION OF THE DRAWINGS

FIG. 15 is a diagram showing a map date of the PM quantity used for calculating the PM accumulated estimation value, (a) a diagram showing the balance point, (b) a diagram showing a portion where the map data of a the PM accumulation area (A) exists, and (c) a diagram showing a portion where the map data of a the PM accumulation area (B) exists;

FIG. 16 is a diagram for judgment of the PM accumulated estimation value at the regeneration mode operation start, (a) a diagram showing the relation between values used for judgment and regeneration interval, (b) a diagram showing an engine operation area (B) when the PM1<=the PMs<the PM2, and (c) a diagram showing an engine operation area (A+B) when the PM2<=the PMs<the PM3.

DETAILED DESCRIPTION OF THE INVENTION

Now, the diesel particulate filer unit (referred to as DPF unit, hereinafter) of a first embodiment of the present invention shall be described referring to drawings.

Figure 1:
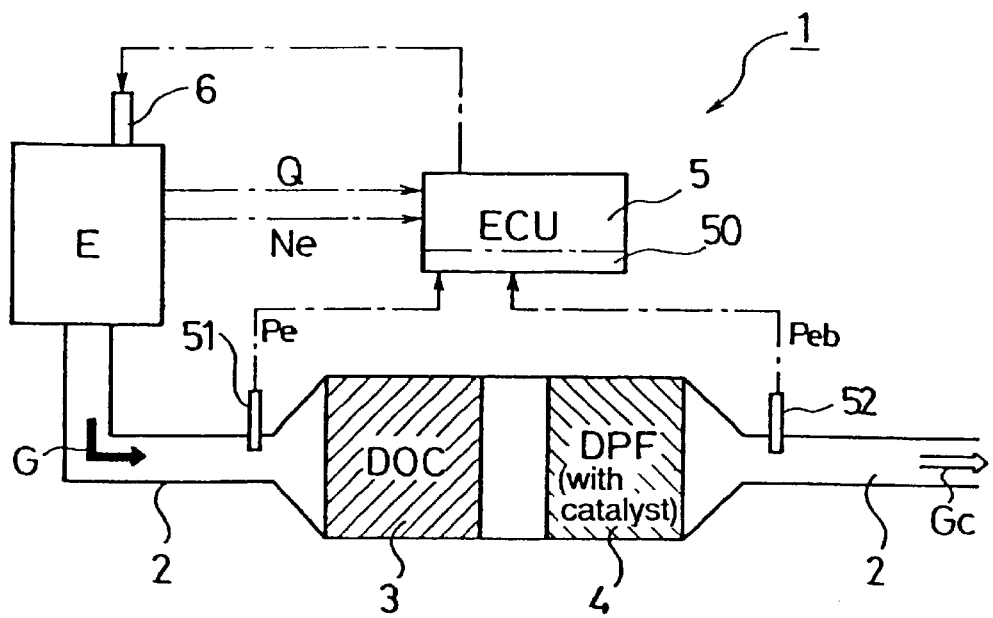
FIG. 1 is a composition diagram of the diesel particulate filer unit of a first embodiment of the present invention.

FIG. 1 shows the composition of a DPF unit 1 of the first embodiment. The DPF unit 1 shown in FIG. 1 is a continuous regeneration type DPF unit, installed in a exhaust passage 2 of an engine E, having an oxidation catalyst 3 and a filter with catalyst 4 disposed from the upstream side.

In addition, a first exhaust pressure sensors 51 is installed at the exhaust entrance side of the oxidation catalyst 3, and, a second exhaust pressure sensors 52 is installed at the exhaust exit side of the filter with catalyst 4, for controlling the regeneration of the filter with catalyst 4.

Output values Pe, Peb from these sensors are input to an engine control unit (ECU: Engine Control Unit) 5 controlling generally the engine operation and, at the same time, including a regeneration control means 50 for performing regeneration control and regeneration operation of the filter with catalyst 4, and a control signal output from the control unit 5 controls a fuel injection unit 6 of the engine E.

On the other hand, the oxidation catalyst 3 is formed by supporting an oxidation catalyst such as platinum (Pt)/γ alumina or the others, on a support of honeycomb structure made of porous ceramics or the others. The filter of the filter with catalyst 4 is formed with a monolith honeycomb form wall flow type filer where the inlet and the outlet of a channel of a honeycomb made of porous ceramics are obtruded alternately, a felt shape filter made by laminating randomly organic fibers of alumina or the like, or the others. It is composed by supporting a catalyst such as platinum (Pt)/γ alumina or the others on a portion of the filter.

Then, in case of adopting a monolith honeycomb form wall flow type as filter of the filter with catalyst 4, particulates (referred to as the PM hereinafter) in an exhaust gas G are trapped by a porous ceramic wall. In case of adopting a fiber form filter type, the PM are trapped by organic fibers of the filter.

Next, a regeneration control method in the DPF unit 1 of the aforementioned composition shall be described.

Figure 2:
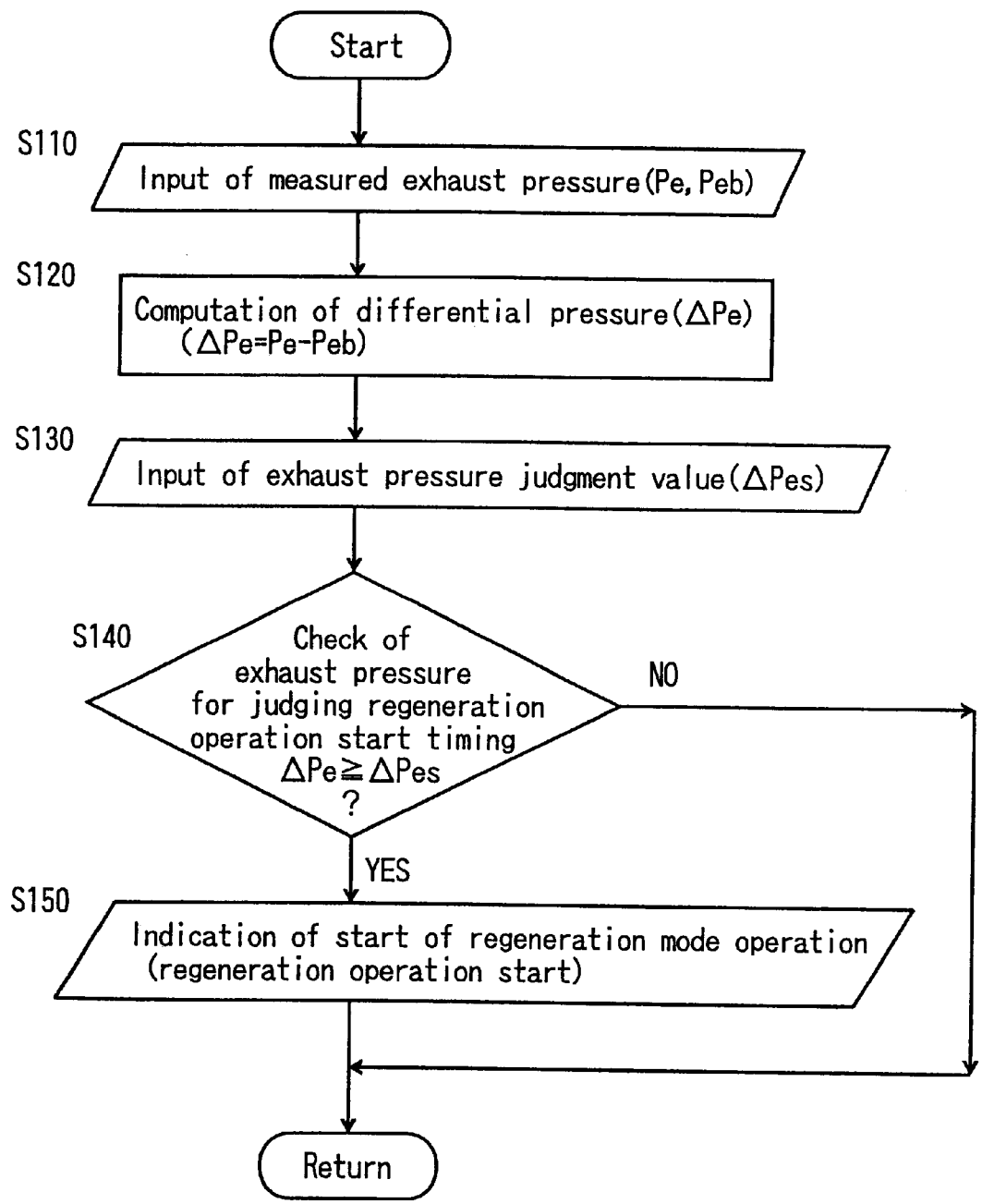
FIG. 2 is a flow diagram illustrating a judgment flow of regeneration start timing of the diesel particulate filer unit of the first embodiment of the present invention.

The regeneration control method is executed by a control program loaded on the control unit 5, or a regeneration control means 50 formed of a control program loaded on the control unit 5, input/output units, or the others, and the judgment of the start of regeneration operation is performed according to a judgment flow of regeneration start timing as illustrated in FIG. 2.

Figure 3:
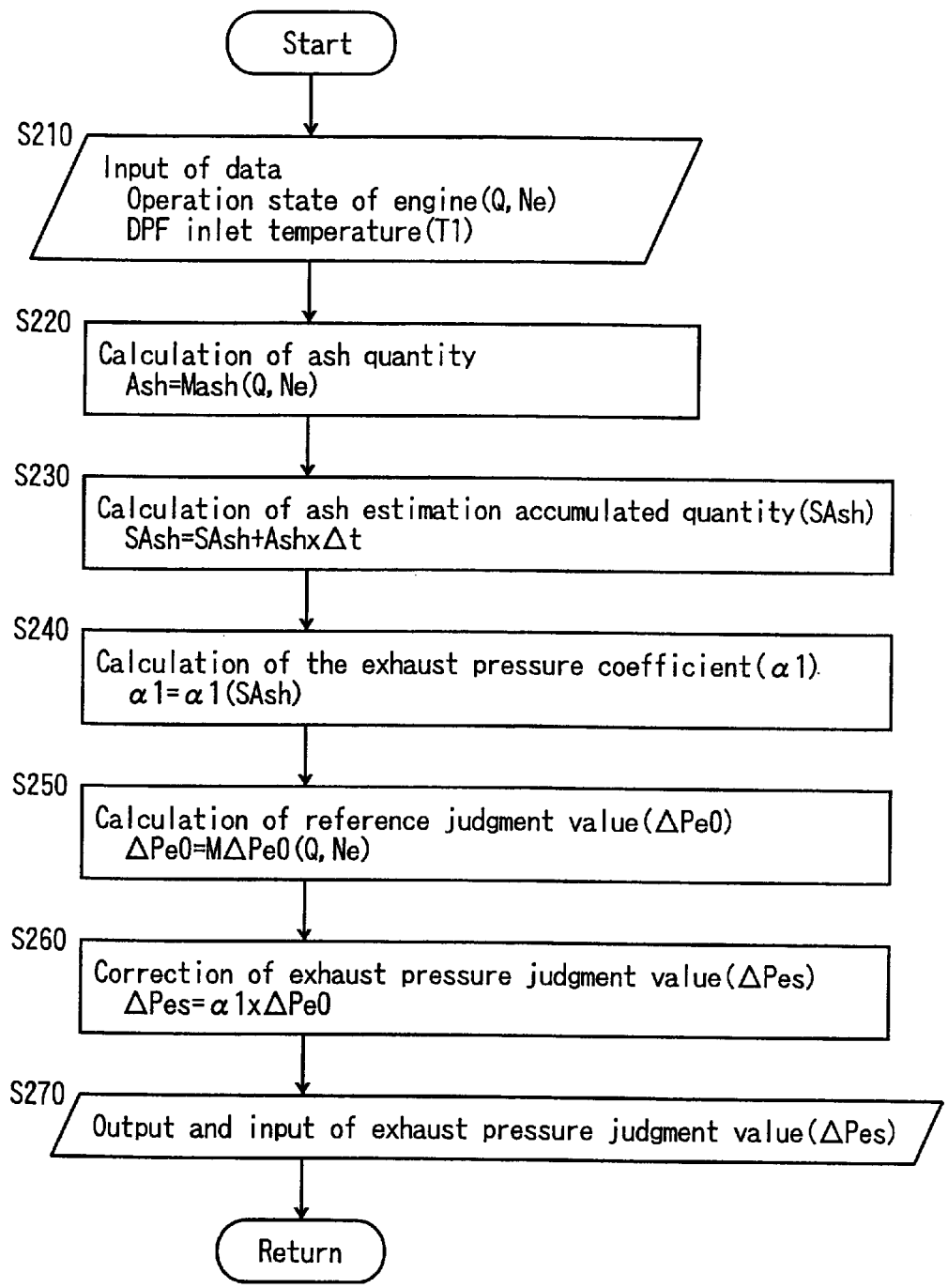
FIG. 3 is a flow diagram illustrating a correction flow of exhaust pressure judgment value.

The judgment flow of regeneration start timing as illustrated is executed in parallel with a (not shown) control flow of the engine E, and a correction flow of exhaust pressure judgment value as shown in FIG. 3 described below. In addition, as necessary, a judgment of regeneration operation start is performed by inputting, an exhaust pressure judgment value ΔPes for judgment of regeneration operation start corrected by the correction flow of the exhaust pressure judgment value of FIG. 3, and in case of judging as start timing, an indication of starting the regeneration mode operation which is a regeneration process is emitted.

In short, it is so composed that the flow is called and executed reiteratively every fixed time, with the correction flow of the exhaust pressure judgment value, during the operation control of the engine E, and upon termination of the control of the engine E, these flows are not called no more, and substantially, the regeneration operation of the filter with catalyst 4 terminates at the same time.

In the judgment flow of regeneration start timing shown in FIG. 2, at the start, an exhaust pressure Pe measured by the first exhaust pressure sensors 51 installed upstream the filter 4 and an exhaust pressure Peb measured by the second exhaust pressure sensors 52 installed downstream the filter 4 are input for judging the regeneration control start, in a step S110.

In a step S120, a differential pressure $\Delta Pe=Pe-Peb$ is calculated, and in a step S130, an exhaust pressure judgment value $\Delta Pes$ for judging the regeneration control start corrected by the correction flow of the exhaust pressure judgment value of FIG. 3 is input.

Then, in a step S140, the differential pressure $\Delta Pe$ and a predetermined exhaust pressure judgment value $\Delta Pes$ are compared, and when the measured exhaust pressure $\Delta Pe$ exceeds the predetermined exhaust pressure judgment value $\Delta Pes$, the start of regeneration mode operation is indicated in a step S50 before return, and if not exceeding, it returns as it is.

As processes of the regeneration mode operation, in the DPF unit 1 of FIG. 1, the exhaust gas temperature raises and the oxidation catalyst 3 is activated by the retard of main injection and, furthermore, by the execution of post injection, in the fuel injection control. At the same time, the PM is removed through chemical reaction by the catalyst supported by the filter with catalyst 4, thus regenerating the filter with catalyst 4.

Then, concerning exhaust pressure judgment value $\Delta Pes$ for judging the regeneration control start to be used for the foregoing, it is so configured that the ash accumulated quantity SAsh of combustion remaining ash of lubricant oil of the engine E leaked into the exhaust gas G and accumulated in the filter 4 is estimated and the exhaust pressure judgment value $\Delta Pes$ is corrected and compensated based on the ash accumulated estimation value SAsh.

These correction and compensation are carried out according to the correction flow of the exhaust pressure judgment value as illustrated in FIG. 3.

Figure 4:
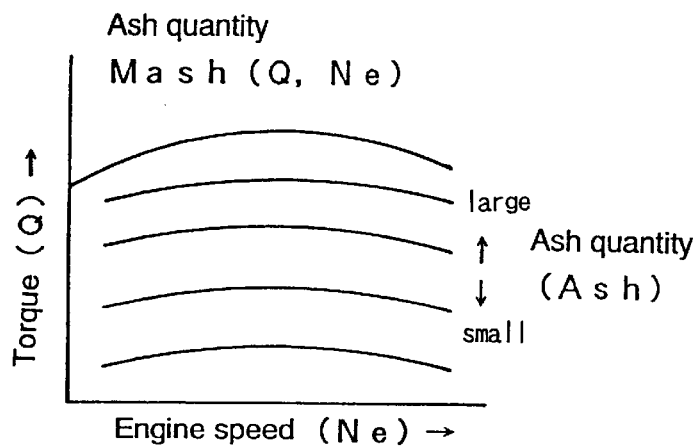
FIG. 4 is a schematic diagram of map data showing the relation between torque of engine and engine speed, and ash quantity to be accumulated in a filter within a unit period of time.

When the flow starts, first of all, in a step S210, torque Q and engine speed Ne indicating the operation state of the engine E are input. In a following step S220, from these torque Q and engine speed Ne, the ash quantity Ash of ash to be accumulated in the filter 4 within a unit time ($\Delta t$) are calculated from a preliminarily input map data Mash (Q, Ne) as shown in FIG. 4.

For the value of the map data Mash (Q, Ne), the ash quantity Ash of ash to be accumulated in the filter with catalyst 4 corresponding the torque Q and engine speed Ne is determined, through a preliminary experiment, computation or the others, and input beforehand in the regeneration control means 50. It should be appreciated that it may be input beforehand in the regeneration control means 50, as a function fash (Q, Ne) calculating As from Q and Ne in place of map data.

In a step S230, the calculated ash quantity Ash is added to the ash accumulated estimation value SAsh (SAsh= SAsh+Ash×$\Delta t$).

In short, the regeneration control means 50 is configured so that the ash quantity Ash of ash to be accumulated in the filter with catalyst 4 in an operation state of an engine E is calculated from the torque Q and engine speed Ne of that engine E, and the calculated ash quantity Ash is submitted to a cumulative computation, for calculating the ash accumulated estimation value SAsh=$\Sigma$(Ash×$\Delta t$).

Figure 5:
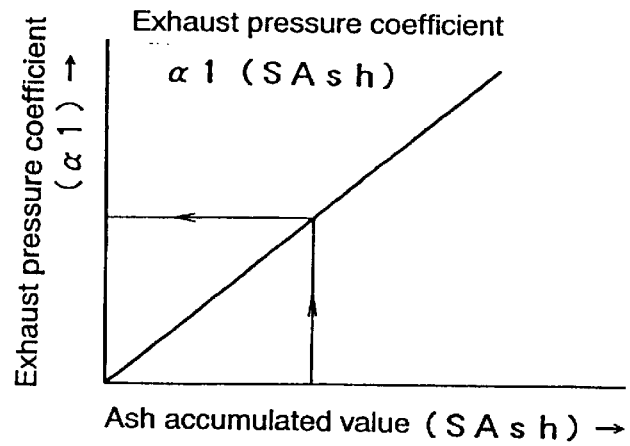
FIG. 5 is a diagram showing the relation between ash accumulated estimation value and exhaust pressure coefficient.
Figure 6:
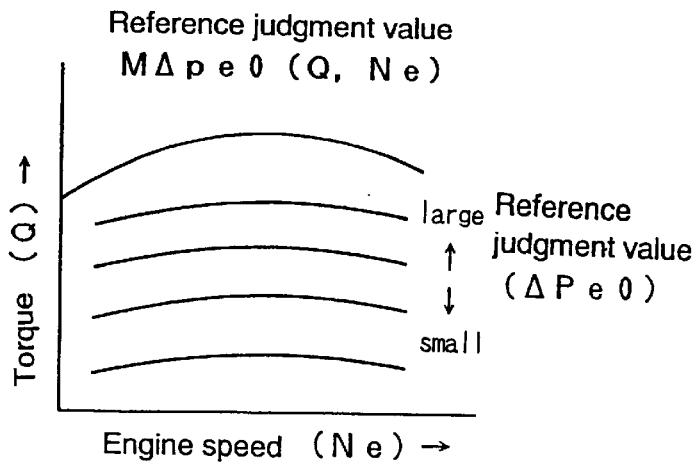
FIG. 6 is a schematic diagram of map data showing the relation between torque of engine and engine speed, and reference judgment value for judging the regeneration start timing.

Then, in a step S240, as shown in FIG. 5, an exhaust pressure coefficient $\alpha 1$ corresponding to the ash accumulated estimation value SAsh is calculated, and in a step S250, an reference judgment value $\Delta Pe0$ in an operation state of an engine E is determined from the torque Q and engine speed Ne of that engine E of the time when exhaust pressures Pe, Peb for judgment of regeneration start timing are measured by the exhaust pressure sensors 51, 52.

In the calculation of reference judgment value $\Delta Pe0$ also, the reference judgment value $\Delta Pe0(Q, Ne)$ for judgment of start timing of regeneration operation concerning the operation state of an engine of engine torque Q and engine speed Ne is determined beforehand by experiment or computation, and the same is prepared as map data M$\Delta pe$ (Q, Ne) or function f $\Delta pe0$ (Q, Ne) and the same is used.

Then, in a step S260, the exhaust pressure judgment value $\Delta Pes$ is corrected (compensated), and the correction is realized by substituting the exhaust pressure judgment value $\Delta Pes$ with a value $\alpha 1 \times \Delta Pe0$ determined by the reference judgment value $\Delta Pe0$ by an exhaust pressure coefficient $\alpha 1$, namely, $\Delta Pes = \alpha 1 \times \Delta Pe0$ being assumed.

At last, in a step S260, the corrected exhaust pressure judgmnt value $\Delta Pes$ is output, before Return.

According to the DPF unit 1 of the first embodiment of the aforementioned composition and the regeneration control method of the same, the following effects can be expected.

The effect of accumulation in the filter with ash 4 of ash left after the combustion of lubricant oil leaking from the combustion chamber of an engine E into the exhaust gas G on the exhaust pressure Pe, Peb can be reflected on the judgment of regeneration start timing, because the exhaust pressure judgment value $\Delta Pes$ to be used for judging the regeneration operation start is corrected with the ash accumulated estimation value SAsh, all the way estimating the state of accumulation on the filter with catalyst 4 of ash left after the combustion of lubricant oil of the engine E. As the result, the judgment of regeneration start timing is performed always appropriately.

Then, the ash quantity Ash accumulating in the filter with catalyst 4 is calculated, using the relation between torque Q of engine and engine speed Ne, and ash accumulation quantity Ash accumulating or depositing in the filter with catalyst 4 in such engine operation state, and the ash accumulated estimation value can be estimated correctly by a simple algorithm, by calculating the accumulated estimation value SAsh through a cumulative computation of the ash quantity.

In addition, as the correction of exhaust pressure judgment value $\Delta Pes$ is realized by a simple computation of substituting with a value $\alpha 1 \times \Delta Pe0$ determined by multiplying the reference judgment value $\Delta Pe0$ by an exhaust pressure coefficient $\alpha 1$ corresponding to the accumulated estimation value SAsh, the operation for reflecting the effect of ash of lubricant oil on the judgment of regeneration start timing can be performed by an extremely simple computation.

Moreover, as the reference judgment value $\Delta Pe0$ is calculated from the torque Q of engine and the engine speed Ne, determined beforehand through experiment or computation, the measured exhaust pressure Pe, Peb and the exhaust pressure judgment value $\Delta Pes$ for comparison can be compared one the other for the operation state of a same engine. Consequently, the difference of exhaust pressure Pe, Peb due to the difference of operation state of the engine is cancelled, and the judgment of regeneration start timing can be performed more finely.

It should be appreciated that concerning the judgment of start timing of the regeneration operation, in addition to the embodiment, there is also a DPF unit for starting the regeneration operation, when a measured exhaust pressure Pe exceeds a predetermined exhaust pressure judgment Pe Pes, by comparing the exhaust pressure Pe measured by the exhaust pressure sensors 51 installed upstream the filter 4 and the predetermined exhaust pressure judgment value Pes and a regeneration control method of the same.

There is also a DPF unit for comparing the pressure ratio Re=Pe/Peb of an exhaust pressure Pe measured by the exhaust pressure sensors 51 installed upstream the filter 4 and an exhaust pressure Peb measured by the exhaust pressure sensors 52 installed downstream the filter 4 and a predetermined pressure ratio judgment value Res, and starting the regeneration operation when the measured pressure ratio Re exceeds the predetermined pressure ratio judgment value Res and a regeneration control method of the same.

Besides, there are DPF units and regeneration control methods thereof by the combination of these several judgments; however, the DPF unit and regeneration control method of the present invention includes not only these DPF units and regeneration control methods thereof, but also the other DPF units and regeneration control methods thereof using the exhaust pressure for judging the start timing of regeneration operation.

Now, the continuous regeneration type DPF unit of a second embodiment of the present invention shall be described referring to the drawings.

Figure 7:
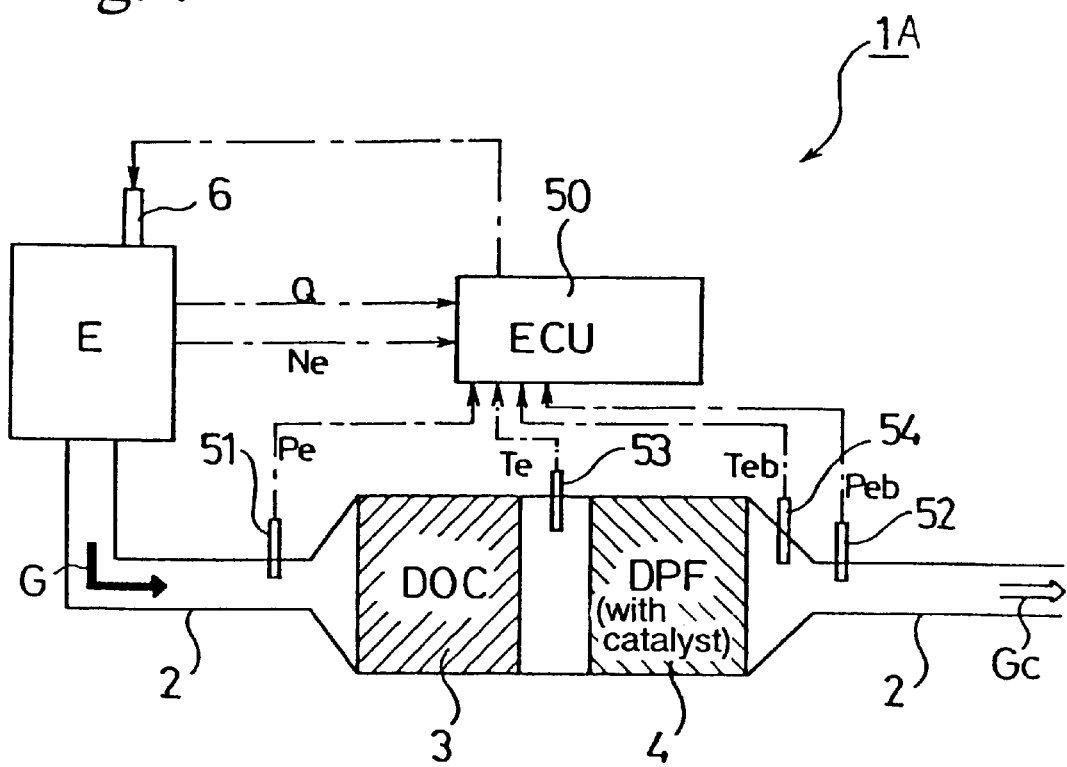
FIG. 7 is a composition diagram of the continuous regeneration type diesel particulate filer unit of a second embodiment of the present invention.

FIG. 7 shows the composition of the continuous regeneration type DPF unit of the second embodiment. The continuous regeneration type DPF unit 1A is a unit installed in an exhaust passage 2 of an engine E, having an oxidation catalyst 3 and a filter with catalyst 4 disposed from the upstream side.

In addition, a first exhaust pressure sensors 51 is installed at the exhaust entrance side of the oxidation catalyst 3, and, first temperature sensors 53 between the oxidation catalyst 3 and the filter with catalyst 4, a second exhaust pressure sensors 52 and a second temperature sensors 54 at the exhaust exit side of the filter with catalyst 4, for controlling the regeneration of the filter with catalyst 4.

Output values from these sensors are input to an engine control unit (ECU: Engine Control Unit) 5 performing a general control of the engine operation and, at the same time, performing the regeneration control of the filter with catalyst 4, and a control signal output from the control unit 5 controls a fuel injection unit 6 of the engine.

On the other hand, the oxidation catalyst 3 is formed by supporting an oxidation catalyst such as platinum (Pt)/γ alumina, zeolite or the others, on a support of honeycomb structure made of porous ceramics or the others, and the filter with catalyst 4 is formed with a monolith honeycomb form wall flow type filer where the inlet and the outlet of a channel of a honeycomb made of porous ceramics are obtruded alternately, a felt shape filter made by laminating randomly organic fibers of alumina or the like, or the others. It is composed by supporting a catalyst such as Pt, γ alumina, zeolite or the others on a portion of the filter.

Then, in case of adopting a monolith honeycomb form wall flow type as filter of the filter with catalyst 4, particulates (referred to as the PM hereinafter) in an exhaust gas G are trapped by a porous ceramic wall, while in case of adopting a fiber form filter type, the PM are trapped by organic fibers of the filter.

Next, a regeneration control method in the continuous regeneration type DPF unit 1A of the aforementioned second embodiment be described.

Figure 8:
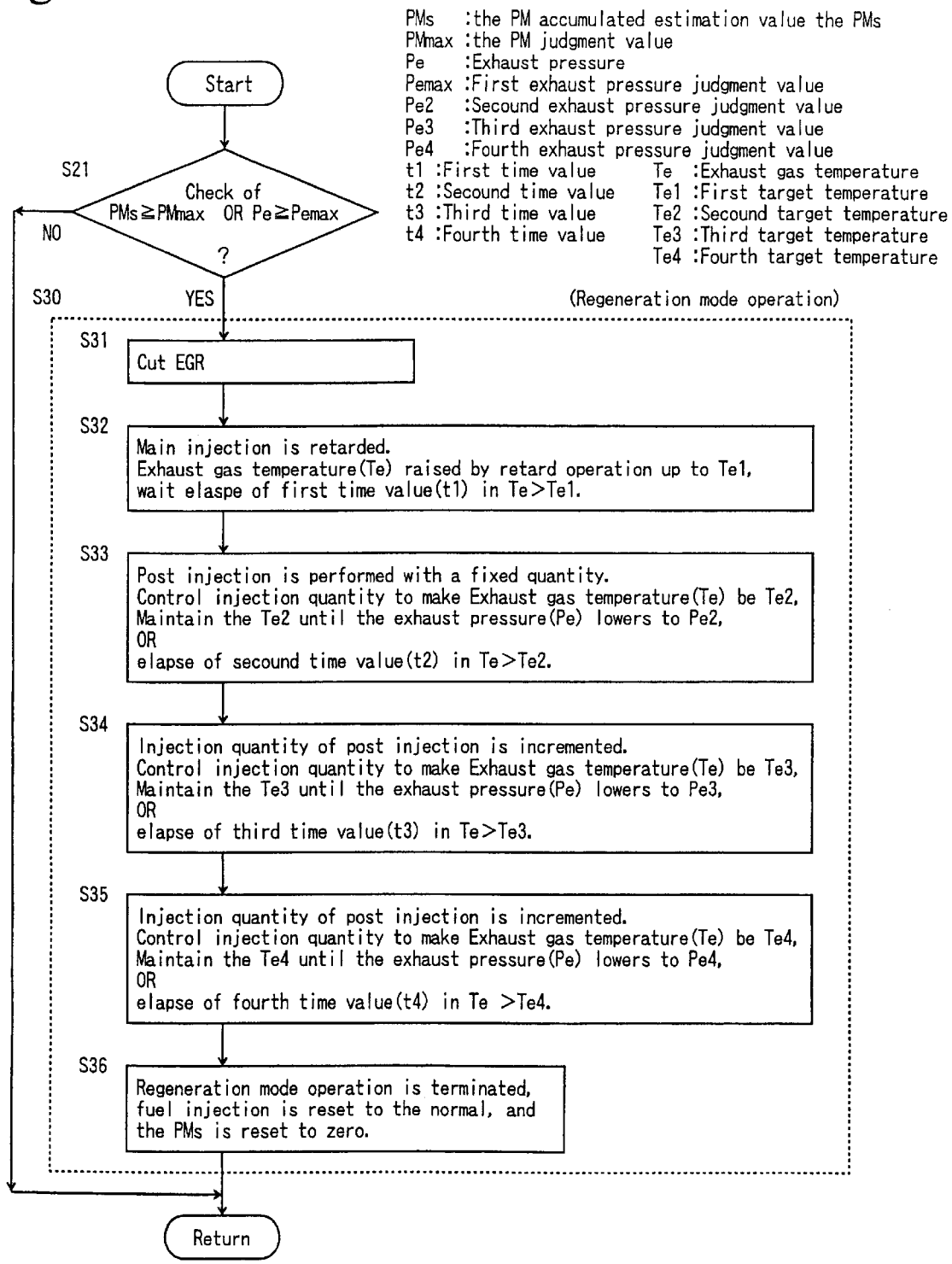
FIG. 8 is a flow diagram showing a regeneration control method of the continuous regeneration type diesel particulate filer unit of the second embodiment of the present invention.

The regeneration control method is executed according to a flow as illustrated in FIG. 8 to fg13.

For the convenience of description, these illustrated flows are shown as regeneration control flows called and executed reiteratively, in parallel with a control flow of the engine E. In short, it is so composed that the flow is called and executed reiteratively every fixed time in parallel during the operation control of the engine E, and upon termination of the control of the engine E, these flows are not called no more, and substantially, the regeneration operation of the filter with catalyst 4 terminates at the same time.

The regeneration control flow is configured to start the regeneration mode operation not only when the exhaust pressure Pe to be detected by the first exhaust pressure sensors 51 exceeds a predetermined first exhaust pressure judgment value Pemax, but also when the accumulation quantity of the PM in the filter with catalyst 4, namely the PM accumulated estimation value the PMs exceeds a predetermined the PM judgment value the PMmax.

In the regeneration control flow illustrated in FIG. 8, first of all, in a step S21, it is judged if the PM accumulated estimation value the PMs exceeds the predetermined the PM judgment value the PMmax, or if the exhaust pressure Pe exceeds the predetermined first exhaust pressure judgment value Pemax, and if either one is the case, it shifts to the regeneration mode operation in a step S30, and if neither one is the case, it Returns.

The flow of the regeneration mode operation in the step S30 is composed of a series of operations including a cut of EGR (exhaust gas recirculate combustion) in a step S31, a temperature elevation first stage for preheating by retarding the timing of main injection of fuel injection in a step S32, a temperature elevation second stage for performing a post injection in a step S33 and injection of a fixed quantity of fuel for starting the PM combustion, a temperature elevation third stage for burning the PM by incrementing the injection quantity of post injection in a step S34, a temperature elevation fourth stage for purging the PM by incrementing further the injection quantity of post injection in a step S35, and a termination of regeneration mode operation in a step S36.

Now, each step shall be described in detail.

Estimation of Accumulated Value of the PM

The calculation of the PM accumulated estimation value the PMs used for judgment of shifting to the regeneration mode operation in the step S21 shall be described in detail.

Figure 9:
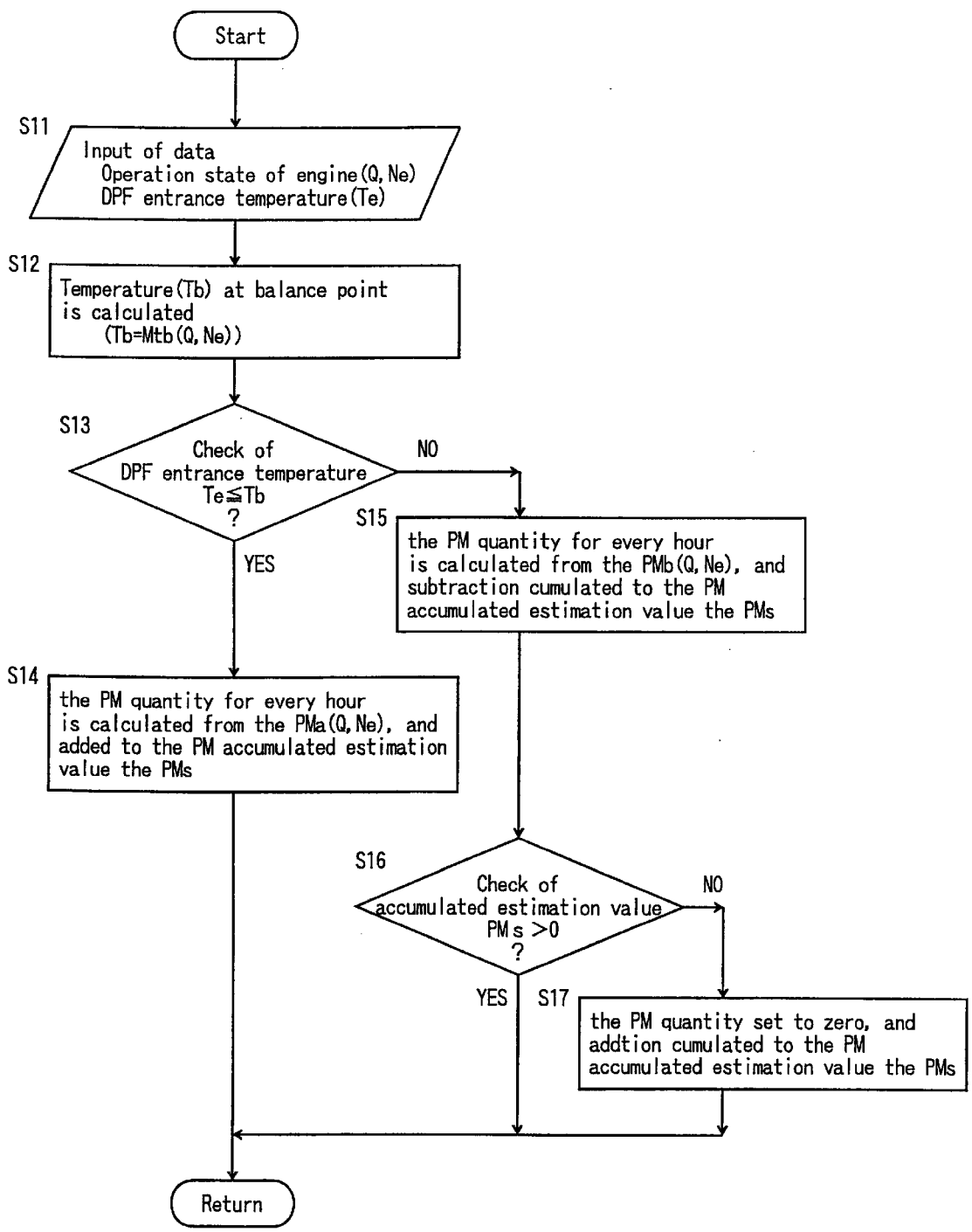
FIG. 9 is a flow diagram for estimation computation of the PM accumulated estimation value.

The PM accumulated estimation value the PMs is executed according to the PM accumulated estimation flow as illustrated in FIG. 9.

In the PM accumulated estimation flow of the FIG. 9, when the flow starts, first of all, in a step S11, torque Q and engine speed Ne showing the operation state of the engine E, and, a DPF entrance temperature Te measured by the first temperature sensors 53 are input.

In a following next step S12, a DPF entrance temperature Tb at the balance point (BP) is calculated from these torque Q and engine speed Ne by means of a preliminarily input map data Mtb (Q, Ne).

The balance point means a portion at the boundary of an area (portion A in FIG. 15) where the captured the PM does not burn and the PM are accumulated, because the exhaust gas temperature is low, and the catalyst activity is low, during an ordinary operation without filter regeneration operation or the others and an area (portion B in FIG. 15) where the exhaust gas temperature is high, the captured the PM burns by catalyst action, and the accumulated the PM diminishes, or a portion (on the line C in FIG. 15) in a balanced state without accumulation of the PM on the filter with catalyst 4 nor decrease thereof.

Then, in a step S13, it is judged if a measured DPF entrance temperature Te is equal or inferior to the DPF entrance temperature Tb at the balance point or not, namely, if it is in the area (portion A in FIG. 15) of the PM accumulation where the operation state of the engine E is in low torque and low revolution speed or not.

In the judgment of the step S13, if the measured DPF entrance temperature Te is equal or inferior to the DPF entrance temperature Tb at the balance point, namely, if it is in the PM accumulation area (A), in a step S14, the deposited the PM quantity for every such time on the filter corresponding to the torque Q and engine speed Ne is calculated from a preliminarily input the PMa (Q, Ne) map data of FIG. 15(b), and this the deposited the PM quantity is added to the PM accumulated estimation value the PMs, before Return.

On the other hand, in the judgment of the step S13, if the measured DPF entrance temperature Te is superior to the DPF entrance temperature Tb at the balance point, namely, if it is in the PM decrease area (B), in a step S5, the PM quantity to be removed corresponding to the torque Q and engine speed Ne is calculated from a preliminarily input the PMb (Q, Ne) map data of FIG. 15(c), and the PM quantity is subtracted to the PM accumulated estimation value the PMs, before going to a step S16.

In the step S16, it is judged if the PM accumulated estimation value the PMs is larger than zero or not, namely, if the PM is in a deposited state or not and, in the judgment of the step S16, in case where the PM accumulated estimation value the PMs is smaller than zero, the PM accumulated estimation value the PMs is set to zero in a step S17 before Return, and in case of larger than zero, Return as it is.

Judgment for Start of Regeneration Mode Operation

In the step S21 of FIG. 8, it is judged if the PM accumulated estimation value the PMs exceeds the predetermined the PM judgment value the PMmax, or if the exhaust pressure Pe exceeds the predetermined first exhaust pressure judgment value Pemax, and more precisely, the judgment of the PM accumulated estimation value the PMs is controlled to enter the regeneration mode operation in case where the PM accumulated estimation value the PMs is between the PM1 and the PM2, as shown in FIG. 16(a), and the operation state of engine (torque Q, engine speed Ne) is in an oblique line portion (A) under the balance point of FIG. 16(b) and in case where the PM accumulated estimation value the PMs is between the PM2 and the PM3. It should be appreciated that, in case of between the PM2 and the PM3, the operation state of engine (torque Q, engine speed Ne) is in an oblique line portion (A+B) of FIG. 16(c), namely, in the full operation state.

Temperature Elevation First Stage: Preliminary Heating

Figure 10:
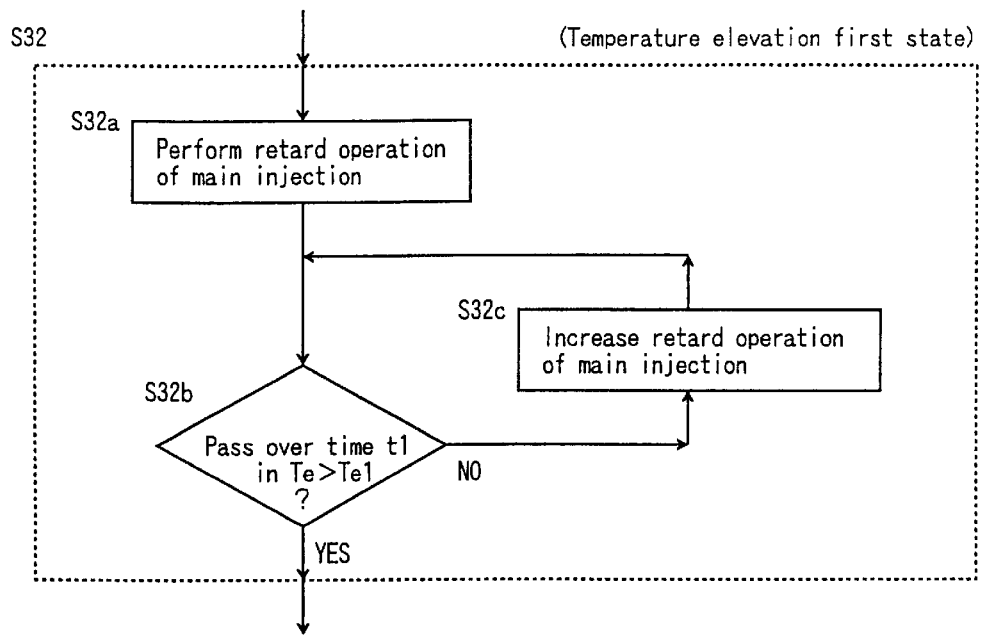
FIG. 10 is a flow diagram of a temperature elevation first stage of preliminary heating by the retard of main injection of fuel injection.

Then, in a step S32 of FIG. 8, the timing of the main injection of fuel injection is retarded, and the exhaust gas temperature is raised by the retard operation; however, in the step S32, as shown in a detail flow of FIG. 10, in a step S32a, the main injection is retarded, and the exhaust gas temperature is raised by the retard operation. In a next step S32b, it is judged if the DPF entrance temperature (exhaust gas temperature) Te measured by the first temperature sensors 53 exceeds a predetermined first target temperature Te1 (for example 200 to 250° C.) or not, and if it does not exceeds, the retard quantity of main injection of fuel injection is incremented in a step S32c, and the DPF entrance temperature Te is raised to equal or superior to the first target temperature Te1.

Moreover, in case where the DPF entrance temperature Te exceeds the predetermined first target temperature Te1 in the step S32b and a predetermined first time value t1 or more has elapsed, it goes to a step S33.

A preliminarily heating is performed by the elevation of the exhaust gas temperature and the oxidation catalyst 3 is heated. The temperature elevation and activation of the catalyst avoids generation of white smoke by the post injection.

It should be appreciated that the retard operation of main injection is sustained up to the termination of the regeneration mode operation.

Temperature Elevation Second Stage: the PM Combustion Start

In addition, in a step S33 of FIG. 8, the post ignition is performed, and a fixed quantity of fuel is post injected. Furthermore, the exhaust gas temperature is raised until the DPF entrance temperature Te attains a second target temperature Te2. The second target temperature Te2 is a temperature allowing the PM to burn as shown in FIG. 15, higher than the DPF entrance temperature Tb at the balance point by a predetermined temperature (for example 50° C.), of the order of about 250° C. to 350° C.

Figure 11:
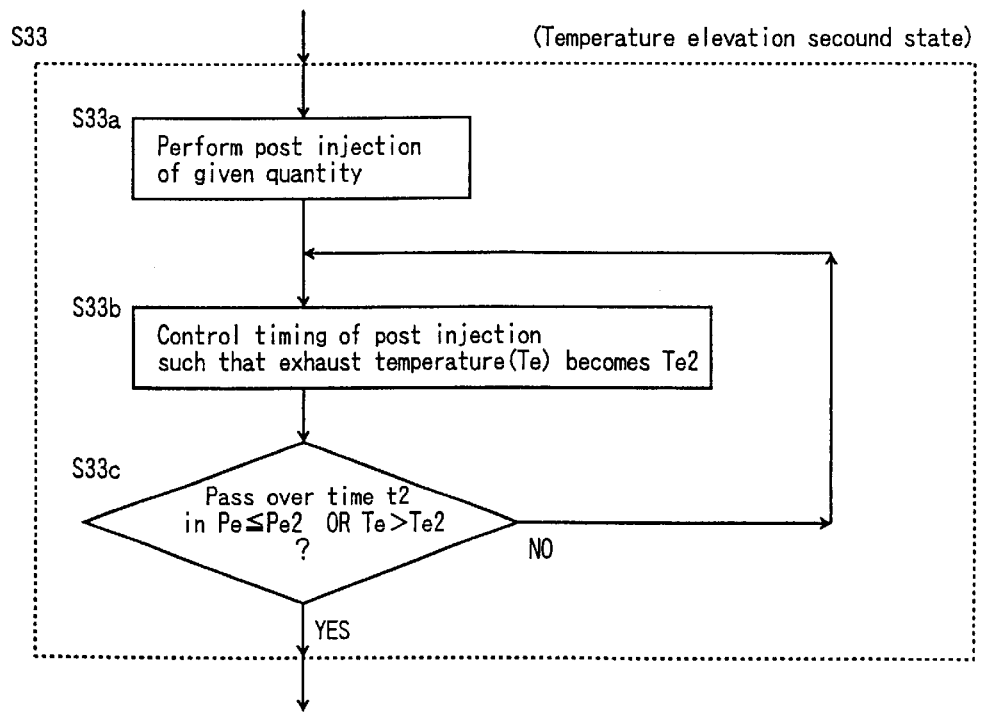
FIG. 11 is a flow diagram of a temperature elevation second stage of the PM combustion start by a post injection of a fixed quantity of fuel injection.

In the step S33, as shown in a detailed flow of FIG. 11, a post injection of a fixed quantity is performed in a step S33a, and further, the DPF entrance temperature Te is raised to the second target temperature Te2. In a following step S33b, the post injection timing is controlled until the exhaust pressure Pe (or differential pressure $\Delta$Pe) becomes equal or inferior to a predetermined second exhaust pressure value Pe2b (or second differential pressure $\Delta$Pe2) and the second target temperature Te2 is maintained. Also, it can be maintained by controlling the injection quantity.

The exhaust pressure Pe is an exhaust pressure value measured by the first exhaust pressure sensors 51 at the exhaust entrance side of the oxidation catalyst 3, and the differential pressure $\Delta$Pe is a difference $\Delta$Pe=Pe−Peb of the exhaust pressure Pe measured by the first exhaust pressure sensors 51 and the exhaust pressure Peb measured by the second exhaust pressure sensors 52 at the exhaust exit side of the filter with catalyst 4.

Then, in a step S33c, it is judged either if the exhaust pressure Pe (or differential pressure $\Delta$Pe) has become equal or inferior to the predetermined second exhaust pressure value Pe2 (or second differential pressure $\Delta$Pe2), or the second target temperature Te2 is maintained for a predetermined second time value t2 (for example 300s) and if either one is the case, it shifts to a step S34, and neither on is the case, it returns to the step S33b.

Thereafter, the temperature of the filter with catalyst 4 is raised, to start burning the PM.

Then, the start of the PM combustion can be confirmed by the fact that the exhaust pressure Pe (or differential pressure $\Delta$Pe) becomes equal or inferior to the predetermined second exhaust pressure value Pe2 (or second differential pressure $\Delta$Pe2).

Temperature Elevation Third Stage: the PM Combustion

In a following step S34 in FIG. 8, the ignition amount of post ignition is incremented, the exhaust gas temperature is raised and controlled to be appropriate for the PM combustion, namely, so that the DPF entrance temperature Te becomes a third target temperature Te3 which is superior to the second target temperature Te2. The third target temperature Te3 is a temperature higher than the DPF entrance temperature Tb at the balance point by a predetermined temperature (for example 150° C.), of the order of about 350° C. to 500° C.

Figure 12:
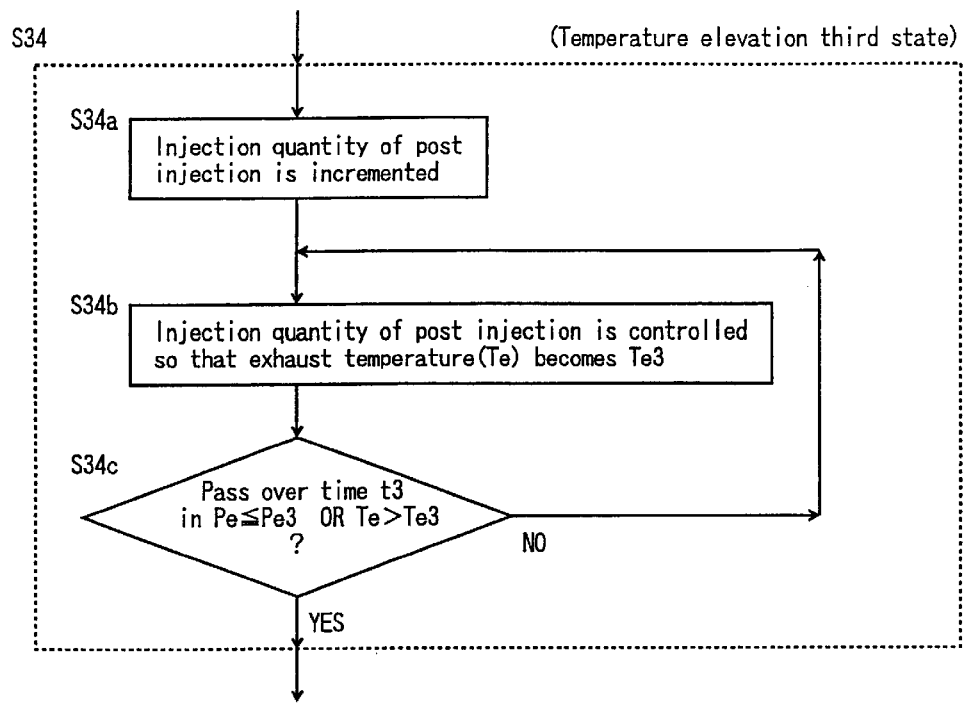
FIG. 12 is a flow diagram of a temperature elevation third stage of the PM combustion by an increase of post injection quantity of fuel injection.

In the step S34, as shown in a detailed flow of FIG. 12, the ignition amount of post ignition is incremented in a step S34a. In a following step S34b, the injection quantity of post injection is controlled until the exhaust pressure Pe (or differential pressure ΔPe) becomes equal or inferior to a predetermined third exhaust pressure value Pe3 (or third differential pressure ΔPe3) and the third target temperature Te3 is maintained.

Then, in a step S34c, it is judged either if the exhaust pressure Pe (or differential pressure ΔPe) has become equal or inferior to the predetermined third exhaust pressure value Pe3 (or third differential pressure ΔPe3), or the third target temperature Te3 is maintained for a predetermined third time value t3 (for example 600s) and if either one is the case, it shifts to a step S35, and neither one is the case, it returns to the step S34b.

In the step S34, the PM combustion is performed at an optimal temperature, by controlling the ignition amount of post ignition.

Temperature Elevation Fourth Stage: the PM Purge

In a step S35 in FIG. 8, the ignition amount of post ignition is further incremented and controlled so that the DPF entrance temperature Te becomes a fourth target temperature Te4 (for example 600° C.).

Figure 13:
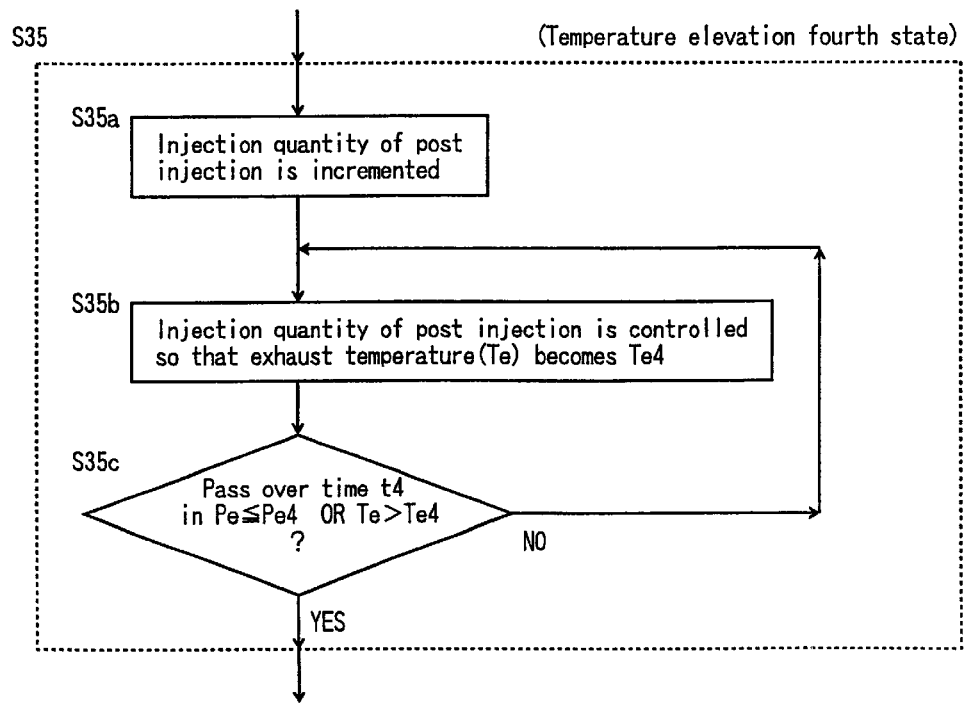
FIG. 13 is a flow diagram of a temperature elevation forth stage of the PM purge by a further increase of post injection quantity of fuel injection.

In the step S35, as shown in a detailed flow of FIG. 13, the ignition amount of post ignition is incremented in a step S35a. In a following step S35b, the injection quantity of post injection is controlled until the exhaust pressure Pe (or differential pressure ΔPe) becomes equal or inferior to a predetermined fourth exhaust pressure value Pe4 (or fourth differential pressure ΔPe4) and the DPF entrance temperature Te is maintained at the fourth target temperature Te4.

Then, in a step S35c, it is judged either if the exhaust pressure Pe (or differential pressure ΔPe) has become equal or inferior to the predetermined fourth exhaust pressure value Pe4 (or fourth differential pressure ΔPe4), or the fourth target temperature Te4 is maintained for a predetermined fourth time value t4 (for example 300s) and if either one is the case, it shifts to a step S36, and neither one is the case, it returns to the step S35b.

By the temperature elevation operation, it is planned to purge the PM captured in the filter.

Termination of Regeneration Mode Operation

Then, in a step S36 shown in FIG. 8, the regeneration mode operation is terminated, the fuel injection is reset to the normal, and at the same time, the PM computation cumulative value the PMs is reset to zero.

It should be appreciated that, if the exhaust pressure Pe is checked and memorized during the regeneration termination, and becomes superior to a predetermined exhaust pressure value Pemax, a warning lamp turns on, for informing the driver of the end of life of the filter.

In addition, in respective stages of the aforementioned flow, the DPF entrance temperature Te is monitored, and if it becomes equal or superior to a limit temperature (Temax: for example 700° C.), the post injection is suspended and, at the same time, the retard operation of main injection is cancelled, interrupting the regeneration mode operation. This allows to avoid the fusion damage of the filter by a sudden temperature elevation due to the PM combustion.

Along with them, in case where the temperature Teb measured by the second temperature sensors 54 installed at the exhaust exit side of the filter with catalyst 4 becomes equal or or superior to a predetermined temperature, the torque is decreased automatically, or other engine running operations are performed for preventing the filter with catalyst 4 from fusion damage.

Moreover, in case of interruption of the regeneration processing, the PM remaining quantity the PMs' is estimated from exhaust pressure Pe' at the previous regeneration termination, exhaust pressure Pe" at the beginning of regeneration of this time, and exhaust pressure Pe at the regeneration interruption, and the PM remaining quantity the PMs' is adopted as the value at the beginning of integration of the PM accumulated estimation value the PMs.

Besides, the relation among the first exhaust pressure value Pemax, the second exhaust pressure value Pe2 (or second differential pressure value ΔPe2), the third exhaust pressure value Pe3 (or third differential pressure value ΔPe3), and the fourth exhaust pressure value Pe4 (or fourth differential pressure ΔPe4) decreases in the order. In short, they are in a relation of Pemax>Pe2>Pe3>Pe4 (or ΔPe2>ΔPe3>ΔPe4).

Figure 14:
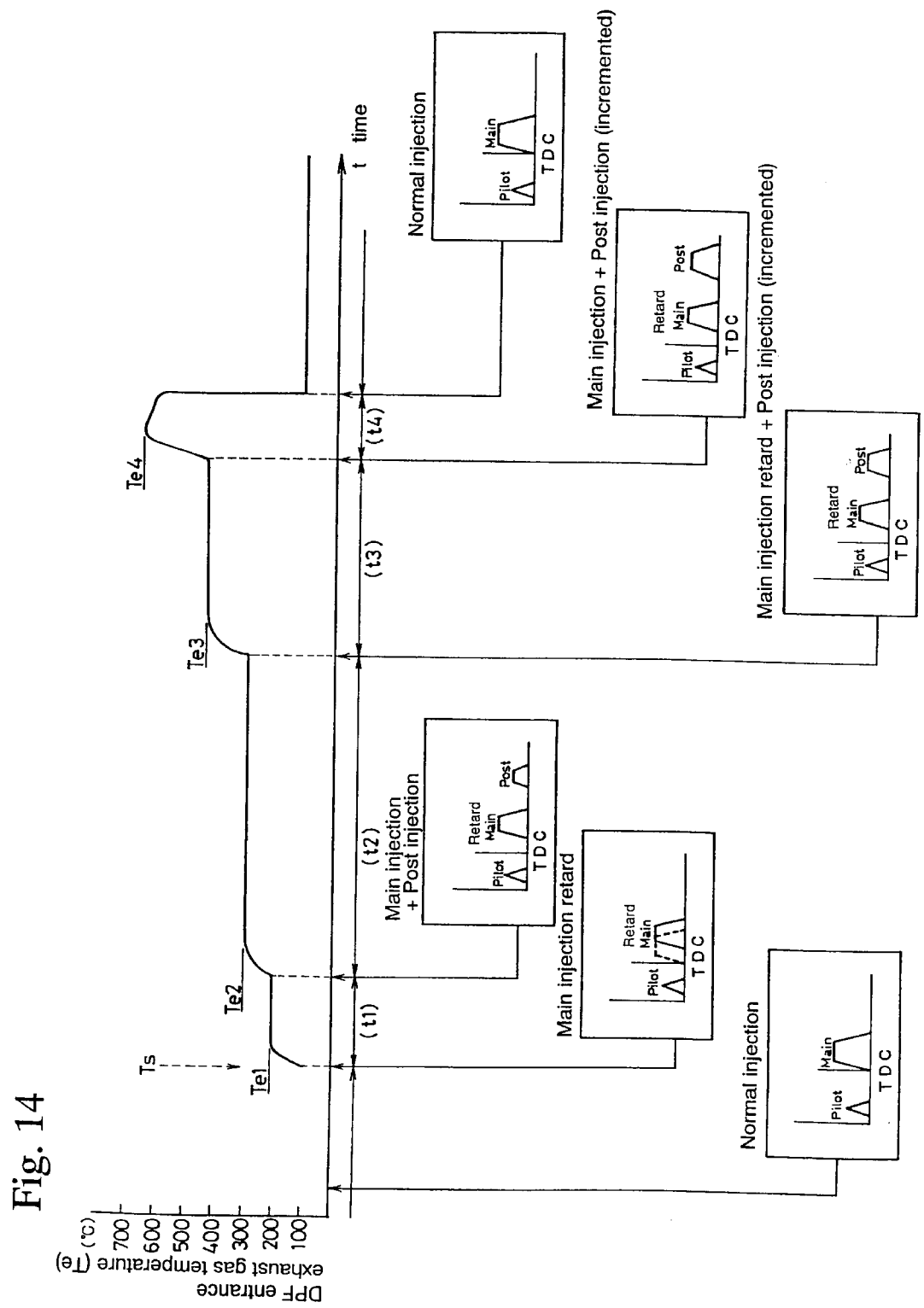
FIG. 14 is a time series diagram showing the chronic evolution of DPF entrance temperature in the regeneration mode operation.
Figure 17:
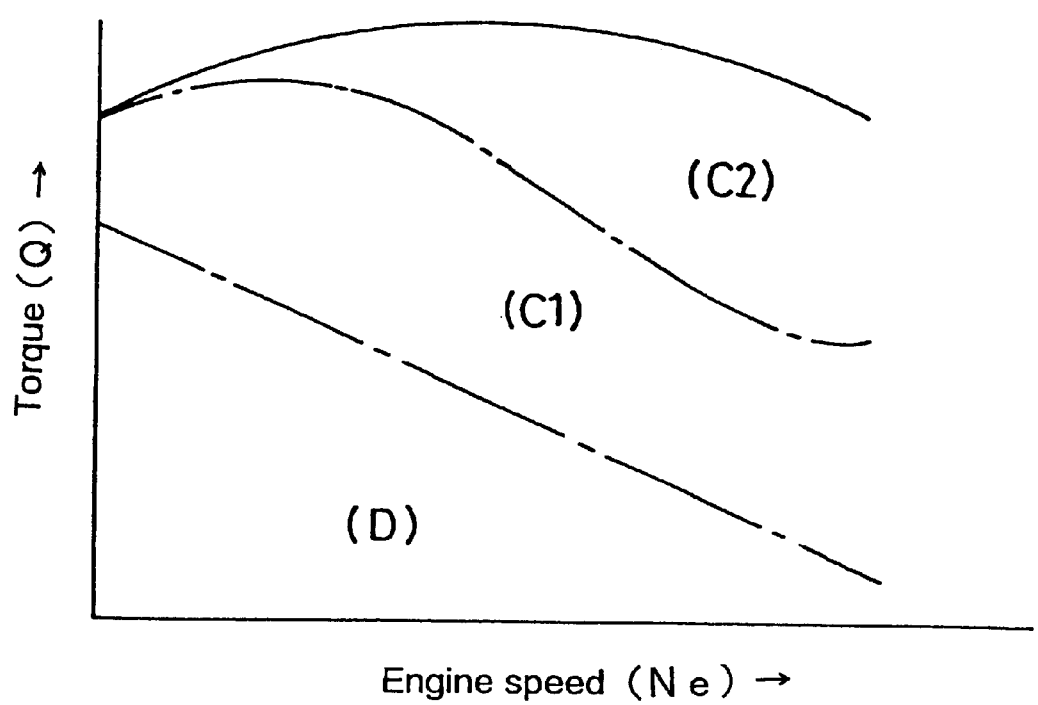
FIG. 17 is a diagram showing the relation between the operation area of engine (torque and engine speed) and the mechanism of the PM cleaning in the exhaust gas, in a continuous regeneration type diesel particulate filer unit of the related art.

In the regeneration control method of the continuous regeneration type DPF unit of the second embodiment as mentioned above, the regeneration of the filter with catalyst 4 is performed in a time series of the DPF entrance temperature Te as shown in FIG. 14, as mentioned below.

If the PM deposits during an engine operation such as ordinary traveling state or idling state or the others, the PM accumulated estimation value the PMs becomes superior to a predetermined judgment value the PMmax or the exhaust pressure Pe becomes superior to the first exhaust pressure value Pemax, it shifts to the regeneration mode of the step S30, by the judgment of the step S21 in FIG. 8.

At the regeneration mode start point of time ts, EGR (exhaust gas recirculate combustion) is cut in the step S31, and at the same time, the timing of main injection of fuel injection is retarded in the step S32, and the exhaust gas temperature is raised by the retard operation.

Moreover, if the DPF entrance temperature Te exceeds the first target temperature Te1 (about 200 to 250° C.), in the step S33, the post injection is performed, and a fixed quantity of post injection is executed. Furthermore, the DPF entrance temperature Te is raised to the second target temperature Te2 (about 350° C.), for starting the PM combustion.

Then, when the start of the PM combustion is confirmed by the fact that the exhaust pressure Pe (or differential pressure ΔPe) becomes equal or inferior to the predetermined second exhaust pressure value Pe2 (or second differential pressure ΔPe2), in the step S34, the injection quantity of post injection is incremented, and the DPF entrance temperature Te is controlled to maintain the third target temperature Te3 (about 500° C.), so that the exhaust gas temperature becomes a temperature appropriate for the PM combustion, and the PM combustion is performed at a temperature optimal for the PM combustion.

Then, combustion of almost all accumulated the PM is confirmed by the fact that the exhaust pressure Pe (or differential pressure ΔPe) becomes equal or inferior to the predetermined third exhaust pressure value Pe3 (or third differential pressure ΔPe3), and in a step S35, the injection quantity of post injection is incremented furthermore, for purging the PM captured by the filter.

Then, the termination of the PM combustion is confirmed by the fact that the exhaust pressure Pe (or differential pressure ΔPe) becomes equal or inferior to the predetermined fourth exhaust pressure value Pe4 (or fourth differential pressure ΔPe4), and in the step S36, the regeneration mode operation is terminated, the fuel injection is reset to the normal, and at the same time, the PM computation cumulative value the PMs is reset to zero.

The filter with catalyst 4 is regenerated by the series of regeneration control.

According to the aforementioned continuous regeneration type diesel particulate filter (DPF) unit and the regeneration control method of the same, the following effects can be expected.

The oxidation catalyst disposed upstream the continuous regeneration type filter with catalyst can oxidize carbon monoxide (CO) and unburned fuel (HC) or the like in the exhaust gas, for raising the exhaust gas temperature flowing into the filter with catalyst; therefore, the temperature of the filter with catalyst can raise even in an engine operation state at a relatively low exhaust gas temperature, allowing to burn and remove particulates (the PM) being captured.

Then, in a normal operation, during an operation state of an engine of low torque, low revolution speed, or the others where captured particulates are not burned and not removed, the PM can be burned and removed by raising the exhaust gas temperature, through retard operation of main injection timing of fuel injection and post injection.

Consequently, the filter with catalyst is not clogged even during a prolonged idling operation, a low speed operation, or other operation state of an engine of low torque, low revolution speed, or the others where captured particulates are not burned and not removed, allowing to capture continuously particulates in the exhaust gas.

On the other hand, as combustion of particulate can be controlled by controlling the exhaust gas temperature through retard operation of main injection timing or post injection of fuel injection, without using a heating heater, the fuel injection can be performed by a fuel injection control unit which is already installed; therefore, it becomes unnecessary to install additionally a heater for heating, a power supply, or other new equipment or new control units, allowing to make the unit compact.

In addition, the temperature of exhaust gas entering the filter with catalyst is raised in two (2) stages or in multiple stages, allowing to prevent a sudden elevation of temperature provoked by a sudden combustion of deposited the PM in a chain reaction manner, and to avoid the fusion damage of the filter with catalyst.

Moreover, the regeneration mode operation is entered based on the PM accumulated estimation value by the computation, the regeneration processing of the filter with catalyst can be performed at an optimal timing. Therefore, the particulate can be captured, burned and removed efficiently, all the way preventing the fuel efficiency from deteriorating.

Furthermore, a preliminarily heating is performed by the elevation of exhaust gas temperature and the oxidation catalyst is preheated when the regeneration mode operation starts, and then the post injection is performed, allowing to prevent generation of white smoke, that otherwise appears often during the regeneration start.

What is claimed is:

1. A diesel particulate filer unit comprising:
   a filter to capture particulates in exhaust gas of a diesel engine;
   a plurality of exhaust pressure sensors disposed in an exhaust passage of the diesel engine; and
   a regeneration control unit to start a regeneration operation of said filter according to judgment results based on a comparison between exhaust pressures measured by the exhaust pressure sensors and a predetermined exhaust pressure judgment value, and to regenerate said filter by removing the particulates captured by said filter through combustion or chemical reaction by a catalyst, wherein
   said regeneration control unit estimates an ash accumulated quantity of ash leaked into the exhaust gas and accumulated in said filter, and corrects said exhaust pressure judgment to judge a starting of the regeneration of the filter based on the estimated ash accumulated quantity, and
   the regeneration control unit calculates an ash quantity accumulated in said filter during an engine operation state, from a torque of the engine and an engine speed, and calculates the estimated ash accumulated quantity, through the cumulative computation of the calculated ash quantity.

2. A diesel particulate filer unit comprising:
   a filter to capture particulates in exhaust gas of a diesel engine;
   a plurality of exhaust pressure sensors disposed in an exhaust passage of the diesel engine; and
   a regeneration control unit to start a regeneration operation of said filter, according to judgment results based on a comparison between exhaust pressures measured by the exhaust pressure sensors and a predetermined exhaust pressure judgment value, and to regenerate said filter by removing the particulates captured by said filter through combustion or chemical reaction by a catalyst, wherein
   said regeneration control unit estimates an ash accumulated quantity of ash leaked into the exhaust gas and accumulated in said filter, and corrects said exhaust pressure judgment value to judge a starting of the regeneration of the filter based on the estimated ash accumulated quantity, and
   wherein the regeneration control unit calculates an exhaust pressure coefficient corresponding to said estimated ash accumulated quantity, and corrects said exhaust pressure judgment value, to a value determined by multiplying a reference judgment value by the exhaust pressure coefficient.

3. The diesel particulate filer unit of claim 2, wherein the regeneration control unit calculates said reference judgment value from the torque of the engine and the engine speed, when the exhaust pressures to judge the starting of the regeneration of the filter is measured by said exhaust pressure sensors.

4. A continuous regeneration type diesel particulate filer unit comprising:
   a filter with catalyst to capture particulates in exhaust gas from a diesel engine and to burn the captured particulates by catalytic action, wherein an oxidation catalyst is disposed upstream of the filter with catalyst to raise an exhaust gas temperature through oxidation of HO and CO in the exhaust gas;
   a regeneration control unit to perform a regeneration processing against clogging of said filter with catalyst and, wherein said regeneration control unit is configured to activate said oxidation catalyst by raising the exhaust gas temperature through fuel injection control of the engine, during regeneration of said filter with catalyst under an engine operation condition where the exhaust gas temperature between the oxidation catalyst and the filter with catalyst is lower than an activation temperature of said oxidation catalyst, to burn and remove the particulates captured by said filter with catalyst.

5. A continuous regeneration type diesel particulate filer unit comprising:

a filter with catalyst to capture particulates in exhaust gas from a diesel engine and to burn the captured particulates by catalytic action, wherein an oxidation catalyst is disposed upstream of the filter with catalyst to raise an exhaust gas temperature through oxidation of HG and CO in the exhaust gas;

a regeneration control unit to perform a regeneration processing against clogging of said filter with catalyst and, wherein said regeneration control unit is configured to activate said oxidation catalyst by raising the exhaust gas temperature through fuel injection control of the engine, during regeneration of said filter with catalyst under an engine operation condition where the exhaust gas temperature of the engine is lower than an activation temperature of said oxidation catalyst, to burn and remove the particulates captured by said filter with catalyst, wherein the filter is configured to raise the exhaust gas temperature by said fuel injection control in two or more stages.

6. The continuous regeneration type diesel particulate filer unit of claim 5, wherein said fuel injection control is configured to comprise, at least, either one of retard operation of main injection or post injection operation.

7. A regeneration control method in a diesel particulate filer unit comprising a filter to capture particulates in exhaust gas of a diesel engine, a plurality of exhaust pressure sensors disposed in an exhaust passage; and a regeneration control unit to start a regeneration operation of said filter according to judgment results based on a comparison between exhaust pressures measured by the exhaust pressure sensors and a predetermined exhaust pressure judgment value, and to regenerate said filter by removing the particulates captured by said filter through combustion or chemical reaction by a catalyst, the method comprising:

estimating an ash accumulated quantity of ash leaked into the exhaust gas and accumulated in said filter; and correcting said exhaust pressure judgment value to judge a starting of the regeneration of the filter based on the estimated ash accumulated quantity; and calculating an ash quantity accumulated in said filter during an engine operation state, from a torque of the engine and an engine speed, and calculating the estimated ash quantity, through the cumulative computation of the calculated ash quantity.

8. A regeneration control method in a diesel particulate filer unit comprising a filter to capture particulates in exhaust gas of a diesel engine, a plurality of exhaust pressure sensors disposed in an exhaust passage; and a regeneration control unit to start a regeneration operation of said filter, according to the judgment results based on a comparison between exhaust pressures measured by the exhaust pressure sensors and a predetermined exhaust pressure judgment value, and to regenerate said filter by removing particulates captured by said filter through combustion or chemical reaction by a catalyst, the regeneration control method, comprising:

estimating an ash accumulated quantity of ash leaked into the exhaust gas and accumulated in said filter;

correcting said exhaust pressure judgment value to judge a starting of the regeneration based on the estimated ash accumulated quantity; and calculating an exhaust pressure coefficient corresponding to said estimated ash accumulated quantity, and correcting said exhaust pressure judgment value to a value determined by multiplying a reference judgment value by the exhaust pressure coefficient.

9. The regeneration control method of the diesel particulate filer unit of claim 8, comprising:

calculating said reference judgment value from a torque of the engine and an engine speed when the exhaust pressures to judge the start of the regeneration measured by said exhaust pressure sensors.

10. A regeneration control method in a continuous regeneration type diesel particulate filer unit comprising:

a filter with catalyst to capture particulates in exhaust gas from a diesel engine, and to burn the captured particulates by catalytic action, and an oxidation catalyst disposed upstream of the filter with catalyst with respect to a flow of the exhaust gas to raise an exhaust gas temperature through oxidation of HC and CO in the exhaust gas, the method comprising:

raising the exhaust gas temperature through fuel injection control of the engine, during regeneration of said filter with catalyst under an engine operation condition between the oxidation catalyst and the filter with catalyst between the oxidation catalyst and the filter with catalyst in order to burn and remove particulates captured by said filter with catalyst; and raising the exhaust gas temperature in multiple stages in two or more stages.

11. The regeneration control method of the continuous regeneration type diesel particulate filter unit of claim 10, wherein said fuel injection control is configured to comprise, at least, either one of retard operation of main injection or post injection operation.

12. The regeneration control method of the continuous regeneration type diesel particulate filter unit of claim 11, further comprising:

raising, during said regeneration, the exhaust gas temperature through a retard operation of fuel main injection, and further raising the exhaust gas temperature by adding a fuel post injection operation, when the temperature of the exhaust gas flowing into said filter with catalyst attains a predetermined first target temperature value.

13. The regeneration control method of the continuous regeneration type diesel particulate filter unit of claim 12, further comprising:

further raising the exhaust gas temperature by increasing the injection quantity of fuel post injection, after the temperature of the exhaust gas flowing into said filter with catalyst attains a predetermined second target temperature value by a post injection of fuel of a given quantity, during said fuel post injection operation.

* * * * *

UNITED STATES PATENT AND TRADEMARK OFFICE
CERTIFICATE OF CORRECTION

PATENT NO.    : 6,622,480 B2
DATED         : September 23, 2003
INVENTOR(S)   : Yoshihisa Tashiro et al.

It is certified that error appears in the above-identified patent and that said Letters Patent is hereby corrected as shown below:

Column 19,
Line 65, please change "filer" to -- filter --.

Column 20,
Line 14, after "judgement", please add -- value --.
Lines 24, 49 and 56, please change "filer" to -- filter --.
Line 62, please change "HO" to -- HC --.

Column 21,
Lines 9, 30, 36 and 57, please change "filer" to -- filter --.
Line 15, please change "HG" to -- HC --.
Line 27, after "catalyst,", please begin a new paragraph.
Line 54, after "ash" please add -- accumulated --.

Column 22,
Line 22, please change "filer" to -- filter --.

Signed and Sealed this

Thirtieth Day of December, 2003

JAMES E. ROGAN
*Director of the United States Patent and Trademark Office*